United States Patent
Guan et al.

(10) Patent No.: US 7,412,128 B2
(45) Date of Patent: Aug. 12, 2008

(54) HIGHER ORDER MODE DISPERSION COMPENSATING FIBER AND MODE CONVERTER FOR HIGHER ORDER FIBER

(75) Inventors: Ning Guan, Sakura (JP); Kazuhiko Aikawa, Sakura (JP); Masashi Ikeda, Sakura (JP); Kuniharu Himeno, Sakura (JP); Koichi Harada, Sakura (JP)

(73) Assignee: Fujikura Ltd., Tokyo (JP)

( * ) Notice: Subject to any disclaimer, the term of this patent is extended or adjusted under 35 U.S.C. 154(b) by 0 days.

(21) Appl. No.: 11/739,589

(22) Filed: Apr. 24, 2007

(65) Prior Publication Data

US 2007/0201791 A1    Aug. 30, 2007

Related U.S. Application Data

(62) Division of application No. 10/866,828, filed on Jun. 15, 2004, now Pat. No. 7,263,267.

(30) Foreign Application Priority Data

Jun. 18, 2003    (JP)    ............................. 2003-173422

(51) Int. Cl.
*G02B 6/26* (2006.01)
*G02B 6/42* (2006.01)

(52) U.S. Cl. .............................. 385/28; 385/27; 385/29; 385/31; 385/39; 385/50

(58) Field of Classification Search .................... 385/28
See application file for complete search history.

(56) References Cited

U.S. PATENT DOCUMENTS

| 5,185,827 | A | 2/1993 | Poole |
| 5,802,234 | A | 9/1998 | Vengsarkar et al. |
| 6,434,311 | B1 | 8/2002 | Danziger et al. |
| 6,453,102 | B1 * | 9/2002 | Dong et al. .................. 385/123 |
| 6,628,859 | B2 * | 9/2003 | Huang et al. ................... 385/28 |

(Continued)

FOREIGN PATENT DOCUMENTS

EP    0 418 872 B1    12/1995

(Continued)

OTHER PUBLICATIONS

Lin et al., "Design Theory and Experiments of LP01-LP11 Mode Converter utilizing fused tapered Fiber Coupler", Bulletin of the Institute of Electronics, Information and communication Engineers C-1, vol. J82-C-1, pp. 587-595, 1999.

(Continued)

*Primary Examiner*—Frank G Font
*Assistant Examiner*—Ryan Lepisto
(74) *Attorney, Agent, or Firm*—Sughrue Mion, PLLC

(57) ABSTRACT

A higher order mode dispersion compensating fiber includes an optical fiber and a first loss layer which is provided within the fiber and which attenuates a lower order mode propagating through the optical fiber while not attenuating a higher order mode which is higher than the lower order mode. A dispersion compensating fiber mode converter for a higher order fiber includes a single mode fiber; a higher order mode dispersion compensating fiber; and a fused and extended portion which has been formed by fusing and extending the single mode fiber and the higher order mode fiber. The fused and extended portion converts between the $LP_{01}$ mode of the single mode fiber and the $LP_{02}$ mode of the higher order mode dispersion compensating fiber.

6 Claims, 19 Drawing Sheets

U.S. PATENT DOCUMENTS

| | | | |
|---|---|---|---|
| 6,640,031 B2 * | 10/2003 | Dong et al. | ............ 385/39 |
| 2002/0164140 A1 | 11/2002 | Lysiansky et al. | |
| 2003/0190127 A1 | 10/2003 | SIllard et al. | |
| 2005/0013572 A1 | 1/2005 | Guan et al. | |

FOREIGN PATENT DOCUMENTS

| | | |
|---|---|---|
| EP | 0 783 117 A2 | 7/1997 |
| EP | 0 866 574 A1 | 9/1998 |
| EP | 1 489 444 A2 | 12/2004 |
| JP | 2004-251986 A | 9/2004 |
| JP | 2004-251987 A | 9/2004 |
| WO | WO 01/14918 A1 | 3/2001 |
| WO | WO02/088801 A2 | 11/2002 |

OTHER PUBLICATIONS

S. Choi et al., "a New Type of Mode Converter for Higher Order Mode Dispersion Compensation Based on The Tapered Hollow Optical Fiber", Proc. Conf. on Lasers and Electo-Optics, CTuAA2, 2001.

S. Ramanachandran et al., "Bandwidth control of long-period grating-based mode converters in few-mode fibers", Optics Letters, vol. 27, No. 9, pp. 698-700, 2002.

S. Ramanachandran et al., "1700 km transmission at 40 Gb/s with 100 km amplifier-spacing enable by high-order-mode dispersion-compensation", Proc. European Conf. Opt Comm., WeF-2.2, 2001.

K. Okamoto, "Comparison of calculated and measured impulse responses of optical fibers" Appl. Opt., vol. 18, pp. 2199-2206, 1979.

A. Yariv, "Coupled-mode theory for guided-wave optics", IEEE J. Quantum Electronics, vol. QE-9, pp. 919-933, 1973.

* cited by examiner

HIGHER ORDER MODE DISPERSION COMPENSATING FIBER AND MODE CONVERTER FOR HIGHER ORDER FIBER

Priority is claimed on Japanese Patent Application No. 2003-173422, filed Jun. 18, 2003, the content of which is incorporated herein by reference.

BACKGROUND OF THE INVENTION

1. Field of the Invention

The present invention relates to a higher order mode dispersion compensating fiber, more specifically, to a dispersion compensating fiber which reduces interference between lower and higher order modes (multipass interference: MPI) and diminishes wavelength dependence of the propagation loss in higher order modes. In addition, this invention relates to a mode converter for a higher order fiber for converting between a fundamental and a higher order mode in a wider band with low loss, and can be applied to a higher order mode dispersion compensating fiber module, etc.

2. Description of Related Art

The rapid increase in demand for data communications has created the need for an optical fiber transmission system which can transmit a larger volume of data at a higher rate.

To accommodate such a need, a reduction in residual dispersion in an optical fiber transmission path has been required and dispersion compensating fibers have been employed.

In addition, since the number of wavelengths multiplexed on a single fiber has greatly increased, the power of optical signals propagating through the fiber has also increased, and prevention of degradation of transmission properties of the fiber due to a nonlinear effect is required. Therefore, an optical fiber having a large effective core area $A_{eff}$ is desired for configuring an optical transmission path, and thus a dispersion compensating fiber with a large effective core area is desired.

Unlike the fundamental mode (the $LP_{01}$ mode) used for conventional dispersion compensating fibers, U.S. Pat. No. 5,802,234 discloses a dispersion compensating fiber employing a higher order mode, i.e., the $LP_{02}$ mode, which is higher than the $LP_{01}$ mode.

Such a higher order mode dispersion compensating fiber (HOM-DCF) has a substantially large effective core area due to its design, and has a large chromatic dispersion index (i.e., the absolute value of the chromatic dispersion per unit length). For example, a chromatic dispersion index of, for example, −200 ps/nm/km, has been attained.

In such a higher order mode dispersion compensating fiber, interference between lower and higher order modes propagating therethrough cannot be eliminated. Therefore, a mode converter is needed at a junction between a single mode optical fiber and a higher order mode dispersion compensating fiber in an optical transmission path in order to convert the lower order mode to the higher order mode so that propagation of the lower order mode through the dispersion compensating fiber is minimized.

As a mode converter, fiber couplers (Lin et al., "Design Theory and Experiments of $LP_{01}$-$LP_{11}$ Mode Converter utilizing fused tapered Fiber Coupler", Bulletin of the Institute of Electronics, Information and Communication Engineers C-I, Vol. J82-C-I, pp. 587-595, 1999), holey fibers (HF) (S. Choi et al., "A New Type of Mode Converter for Higher Order Mode Dispersion Compensation Based on The Tapered Hollow Optical Fiber", Proc. Conf. on Lasers and Electro-Optics, CTuAA2, 2001) and long period gratings (LPG) (S. Ramachandran et al. "Bandwidth control of long-period grating-based mode converters in few-mode fibers", Optics Letters, Vol. 27, No. 9, pp. 698-700, 2002) are used, and multipass interference (MPI) which is defined as the difference in insertion loss between lower and higher order modes can be suppressed to the order of −40 dB.

However, such a level of multipass interference is not sufficient for a practical application, and as long as a mode converter is employed, lowering multipass interference is difficult.

A higher order mode dispersion compensating fiber exhibits a large dispersion, has a large $A_{eff}$, and is used for long-haul transmission (e.g., S. Ramachandran et al., "1700 km transmission at 40 Gb/s with 100 km amplifier-spacing enable by high-order-mode dispersion-compensation", Proc. European Conf. Opt Comm., WeF-2.2, 2001).

One of the important technologies to achieve a practical application of higher order mode dispersion compensating fibers is a mode converter for converting from a fundamental mode of a single mode fiber (SMF) to a higher order mode of an HOM-DCF. As an example of such a mode converter, a converter employing a long period fiber grating and a holey fiber has been reported.

Furthermore, an $LP_{01}$-$LP_{11}$ mode converter which employs a fusion tapered fiber coupler using a combination of dual mode ($LP_{01}$ and $LP_{11}$) and single mode ($LP_{01}$) fibers has been proposed.

However, such LPG converters are difficult to manufacture, and their conversion characteristic is susceptible to various environmental factors.

Furthermore, the conversion ratio of HF-type converters from the $LP_{01}$ mode to the $LP_{02}$ mode (hereinafter referred to as "$LP_{01}$-$LP_{02}$ conversion ratio") is low.

Furthermore, Lin does not describe any converters capable of converting to the higher order mode $LP_{02}$.

Accordingly, the present invention is directed to a higher order mode dispersion compensating fiber which reduces propagation in modes lower than a higher order mode, diminishes interference between lower and higher order modes, and further decreases multipass interference.

In addition to solving the first problem mentioned above, the present invention is directed to a higher order mode dispersion compensating fiber which diminishes wavelength dependence of the propagation loss at higher order modes.

The present invention is further directed to a mode converter for a higher order fiber which converts between a fundamental mode and a higher order mode in a wider band with low loss.

SUMMARY OF THE INVENTION

In order to solve the first problem mentioned above, the present invention provides a higher order mode dispersion compensating fiber comprising an optical fiber, and a loss layer which is provided within the fiber and which attenuates a lower order mode propagating through the optical fiber while not attenuating a higher order mode which is higher than the lower order mode.

In the higher order mode dispersion compensating fiber, the loss layer may be provided at a position where the electric field in the electric field distribution profile of the higher order mode becomes zero.

In the higher order mode dispersion compensating fiber, the loss layer may be formed by doping at least one element selected from the group consisting of cobalt, chromium, copper, iron, nickel, manganese, boron, and vanadium into the glass of which the optical fiber is made.

In the higher order mode dispersion compensating fiber, the thickness of the loss layer may be 0.5 µm or less.

According to one aspect to the present invention, the lower order mode is the $LP_{01}$ mode and the higher order mode is the $LP_{02}$ mode in the higher order mode dispersion compensating fiber.

In the higher order mode dispersion compensating fiber, the propagation loss in the lower order mode may be 10 dB/km or greater.

In the higher order mode dispersion compensating fiber, the optical fiber may include: a central core region; a core region which is provided at an outer periphery of the central core region and has a lower refractive index than the refractive index of the central core region; a ring core region which is provided at an outer periphery of the core region and has a refractive index higher than the refractive index of the core region and lower than the refractive index of the central core region; and a cladding which is provided at an outer periphery of the ring core region.

The present invention provides a dispersion compensating module including the above-mentioned higher order mode dispersion compensating fiber.

In the dispersion compensating module, the multipass interference may be 45 dB or greater.

The present invention provides an optical transmission path including the above-mentioned dispersion compensating module.

In order to solve the second problem mentioned above, the present invention provides a higher order mode dispersion compensating fiber comprising: an optical fiber; a first loss layer which attenuates a lower order mode propagating through the optical fiber while not attenuating a higher order mode which is higher than the lower order mode; and a second loss layer which diminishes the wavelength dependence of the propagation loss in the higher order mode.

In the higher order mode dispersion compensating fiber, the first loss layer may be provided at a position where the electric field in the electric field distribution profile of the higher order mode becomes zero, and the second loss layer may be provided outside the first loss layer.

In the higher order mode dispersion compensating fiber, at least one of the first loss layer and the second loss layer may be formed by doping at least one element selected from the group consisting of cobalt, chromium, copper, iron, nickel, manganese, boron, and vanadium into the glass of which the optical fiber is made.

In the higher order mode dispersion compensating fiber, the thickness of at least one of the first and the second loss layers may be 1 µm or less.

According to another aspect of the present invention, the lower order mode is the $LP_{01}$ mode and the higher order mode is the $LP_{02}$ mode in the higher order mode dispersion compensating fiber.

In the higher order mode dispersion compensating fiber, the propagation loss in the lower order mode may be 10 dB/km or greater.

In the higher order mode dispersion compensating fiber, the maximum difference in the propagation loss at the higher order mode may be 0.042 dB/km or less in a wavelength range between 1.5 µm and 1.6 µm, and is 0.0012 dB/km or less in a wavelength range between 1.53 µm and 1.565 µm.

In the higher order mode dispersion compensating fiber, the optical fiber may include: a central core region; a core region which is provided at an outer periphery of the central core region and has a lower refractive index than the refractive index of the central core region; a ring core region which is provided at an outer periphery of the core region and has a refractive index higher than the refractive index of the core region and lower than the refractive index of the central core region; and a cladding which is provided at an outer periphery of the ring core region.

The present invention provides a dispersion compensating module including the above-mentioned higher order mode dispersion compensating fiber.

In the dispersion compensating module, the multipass interference may be 45 dB or greater.

The present invention provides an optical transmission path including the above-mentioned dispersion compensating module.

In order to solve the third problem mentioned above, the present invention provides a dispersion compensating fiber mode converter for a higher order fiber, comprising: a single mode fiber; a higher order mode dispersion compensating fiber; and a fused-elongated portion which has been formed by fusing and elongating the single mode fiber and the higher order mode dispersion compensating fiber, wherein the fused-elongated portion converts between the $LP_{01}$ mode of the single mode fiber and the $LP_{02}$ mode of the higher order mode dispersion compensating fiber.

In the mode converter for a higher order fiber, the fused-elongated portion may be formed by pre-elongating at least one of the single mode fiber and the higher order mode dispersion compensating fiber and then fusing and post-elongating the single mode fiber and the higher order mode dispersion compensating fiber so that the propagation constant $\beta_1$ of the $LP_{01}$ mode substantially equals the propagation constant $\beta_2$ of the $LP_{02}$ mode.

In the above-mentioned mode converter for a higher order fiber, the fused-elongated portion is formed by etching the outer surface of the two fibers by an etchant, e.g., a hydrogen fluoride solution, without changing the characteristics of the fibers and then fusing and elongating the fibers so that an effective coupling between the $LP_{01}$ and the $LP_{02}$ modes is obtained.

In the above-mentioned mode converter for a higher order fiber, the pre-elongation ratio $e_1$ and the post-elongation ratio $e_2$ of at least one of the single mode fiber and the higher order mode dispersion compensating fiber may be between 1 and 3 and between 1 and 5, respectively.

In the above-mentioned mode converter for a higher order fiber, the coupling length and the elongation ratio of the fused-elongated portion are determined so that a complete coupling between the $LP_{01}$ and the $LP_{02}$ modes is obtained.

In the above-mentioned mode converter for a higher order fiber, the conversion ratio from the $LP_{01}$ mode of the single mode fiber to the $LP_{02}$ mode of the higher order mode dispersion compensating fiber may be 75% or higher in a wavelength range between 1.55 µm and 1.65 µm.

In the above-mentioned mode converter for a higher order fiber, the single mode fiber may have a stepped refractive index profile, has a core radius r between 2 µm and 7 µm, and a relative refractive index difference $\Delta$ between 0.0025 and 0.007. The higher order mode dispersion compensating fiber may have radially from the center toward the outside: a first layer which has the highest refractive index; a second layer which is provided at an outer periphery of the first layer and has the lowest refractive index; and a third layer which is provided at an outer periphery of the second layer and has a refractive index in a range between the refractive index of the first layer and the refractive index of the second layer, wherein the first layer has a radius $r_{s1}$ between 2 µm and 8 µm and a relative refractive index difference $\Delta_{s1}$ between 0.005 and 0.025, the second layer has a radius $r_{s2}$ between 4 µm and 14 µm and a relative refractive index difference $\Delta_{s2}$ between −0.005 and 0.005, and the third layer has a radius $r_{53}$ between 8 μm and 25 μm and a relative refractive index difference $\Delta_{53}$ between −0.002 and 0.004.

BRIEF DESCRIPTION OF THE DRAWINGS

These and other features, aspects, and advantages of the present invention will become better understood with reference to the following description, amended claims, and accompanying drawings, which should not be read to limit the invention in any way, in which:

DETAILED DESCRIPTION OF THE INVENTION

First Embodiment

A first embodiment of the present invention which solves the first problem will now be described in detail.

Figure 1:
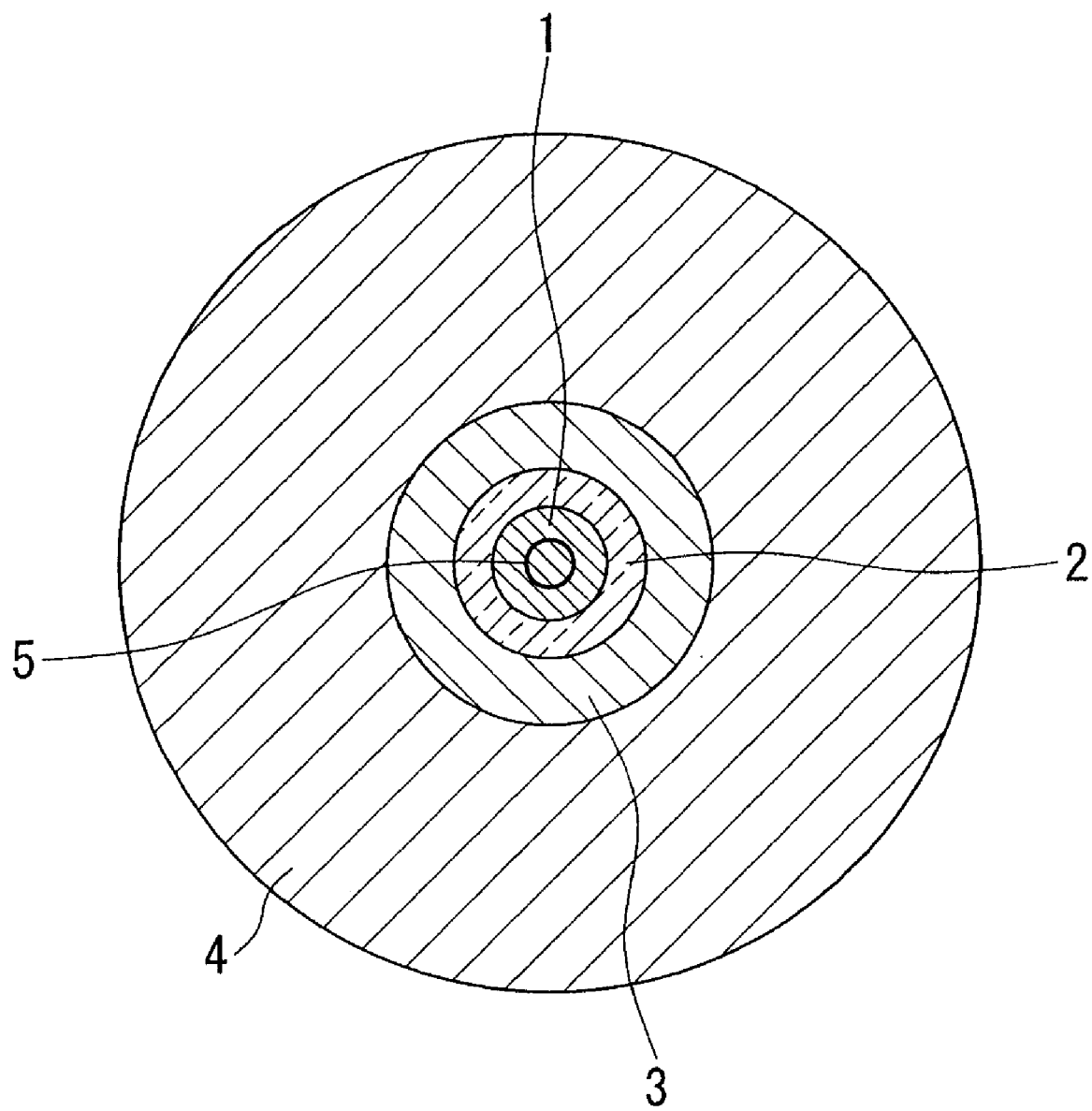
FIG. 1 is a schematic cross-sectional view showing an example of a higher order mode dispersion compensating fiber according to the present invention.
Figure 2:
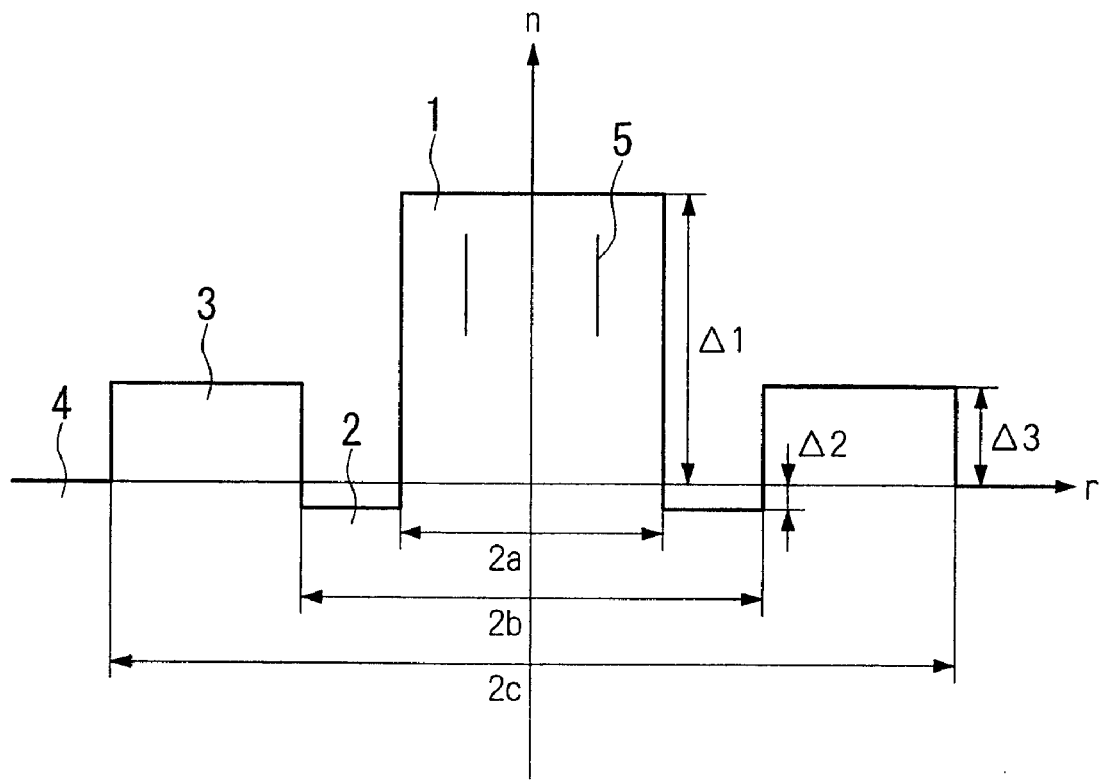
FIG. 2 shows an example of a refractive index distribution profile of a higher order mode dispersion compensating fiber according to the present invention.

FIG. 1 is a schematic cross sectional view illustrating an example of a higher order mode dispersion compensating fiber according to the present invention, and FIG. 2 is a schematic view of the refractive index profile of the higher order mode dispersion compensating fiber shown in FIG. 1.

In FIG. 1, reference numerals 1, 2, 3, and 4 refer to a central core region, a core region, a ring core region, and a cladding, respectively.

The central core region 1 has the highest refractive index, and is made of glass, such as germanium-doped silica; its relative refractive index difference $\Delta_1$ ranges from 0.005 to 0.026, and its external diameter $2a$ ranges from 5 μm to 16 μm.

The core region 2 is provided outside the central core region 1, and its refractive index is lower than those of the central core region 1 and the cladding 4. The core region 2 is made of glass, such as fluorine-doped silica; its relative refractive index difference $\Delta_2$ ranges from $-0.01$ to $+0.006$, and its external diameter $2b$ ranges from 8 μm to 20 μm.

The ring core region 3 is provided outside the core region 2, and its refractive index is lower than that of the central core region 1 and higher than those of the core region 2 and the cladding 4. The ring core region 3 is made of glass, such as germanium-doped silica; its relative refractive index difference $\Delta_3$ ranges from $-0.007$ to $+0.015$, and its external diameter $2c$ ranges from 12 μm to 34 μm.

The cladding 4 is provided outside the ring core region 3, and its refractive index is lower than that of the ring core region 3 and higher than that of the core region 2. The cladding 4 is made of glass such as pure silica, and its external diameter is 125 μm.

As shown in FIG. 1, an annular loss layer 5 is formed inside the central core region 1 of the higher order mode dispersion compensating fiber. FIG. 2 illustrates the loss layer indicated by reference numeral 5 just to exemplify the position of the loss layer, and it is not intended to show the actual value of the refractive index of the loss layer 5. The loss layer 5 inhibits propagation in a fundamental mode, e.g., the $LP_{01}$ mode, while allowing propagation in a higher order mode, e.g., the $LP_{02}$ mode.

The loss layer 5 is a layer made of glass, such as silica doped with at least one element selected from the group consisting of cobalt, chromium, copper, iron, nickel, manganese, boron, and vanadium.

The maximum loss occurring only in the loss layer 5 is about 1000 dB/km.

The loss layer 5 is thin with a thickness of 0.5 μm or less so as not to incur a decrease in the transmission loss in the fiber as a whole.

Furthermore, the loss layer 5 is provided at the point where the electric field intensity in the electric field distribution profile becomes zero. This "zero electric field intensity point" corresponds to a "node" in the electric field distribution of the $LP_{02}$ mode at which the propagation of the $LP_{02}$ mode is not affected.

The attenuation, the thickness, and the position of the loss layer 5 are determined based on Formula (1):

$$P_m(r) = A\exp\left[-\left(\frac{r-r_0}{\delta}\right)^2\right] + B \quad (1)$$

where $Pm(r)$ is material loss in the fiber profile, A is the peak attenuation in the loss layer (dB/km), B is loss in the other layers (dB/km), $r_0$ is a radial distance of the middle point between the top and the bottom of the loss layer from the center, $\delta$ is $2\sqrt{2}\Delta r$, and $\Delta r$ is a full width at half maximum (FWHM) of the loss in the loss layer, provided that the loss layer is thin enough and the loss exhibits a Gaussian distribution.

The propagation losses in the lower and higher order modes are obtained from Formula (2):

$$P_1 = \frac{\int_0^\infty rP_m(r)R^2(r)dr}{\int_0^\infty rR^2(r)dr} \quad (2)$$

where Pl is the propagation loss in each mode (dB/km) and R is the transverse electromagnetic field function when an LP mode is approximated, the calculation of which is described in K. Okamoto, "Comparison of calculated and measured impulse responses of optical fibers", Appl. Opt., Vol. 18, pp. 2199-2206, 1979.

Based on Formulas (1) and (2), structural parameters of the loss layer 5 which provide desired properties can be determined.

A dispersion compensating fiber having such a loss layer 5 can be fabricated by modified chemical vapor deposition. More specifically, a desired loss layer 5 can be formed at the target position by adjusting various conditions. Such conditions include, but are not limited to, the timing when a dopant gas composed of a compound containing at least one of the elements mentioned above is added or supplied to glass source material gas, such as silicon tetrachloride or germanium chloride, which is introduced into a silica tube, the starting substrate, how long the dopant gas is supplied, the amount of the dopant, and the concentration of the doped element in the dopant gas.

In the higher order mode dispersion compensating fiber according to the present invention, the loss layer 5 allows propagation of a higher order mode, e.g., the $LP_{02}$ mode, while substantially inhibiting propagation of a lower order mode, e.g., the $LP_{01}$ mode. The loss in the lower mode is 10 dB/km or greater, and preferably, but not necessarily 20 dB/km or more, which is eight or more times larger than the loss in the higher order mode. Although propagation of a further higher order mode, e.g., the $LP_{03}$ mode, may occur, a loss due to bending (bending loss) becomes significant. Therefore, when the fiber is used in a module, the propagation loss becomes significant and almost all of the propagation is eliminated to a practically acceptable level. In addition, although propagation of the $LP_{11}$ mode may be possible, it is inhibited by the propagation loss consisting of a loss during mode conversion and loss of the loss layer 5, and practically does not affect the operation of the fiber.

As a result, only a higher order mode, e.g., the $LP_{02}$ mode, is propagated through the dispersion compensating fiber. Therefore, modes which have not been converted during the conversion from a fundamental mode to a higher order mode (the $LP_{02}$ mode), for example, the $LP_{01}$ mode, are not propagated at the practically acceptable level, thus multipass interference is minimized. Since the ratio of loss of a higher order mode to loss of a lower order mode depends on the length of the fiber, the multipass interference can be adjusted by changing the length of the fiber.

As disclosed in U.S. Pat. No. 5,802,234, the higher order mode dispersion compensating fiber according to the present invention has a large dispersion index and a large effective core area; it has a chromatic dispersion of $-200$ ps/nm/km or lower, a chromatic dispersion slope of 0 ps/nm$^2$/km, and an effective core area of 50 μm$^2$ or greater.

Therefore, using the dispersion compensating fiber of the present invention, the accumulated dispersion can be compensated even when the fiber is short. Furthermore, it can propagate high power optical signals without degradation of the transmission property caused by a nonlinear effect.

A dispersion compensating module according to the present invention is a coil of the desired length of the above-mentioned higher order mode dispersion compensating fiber which is wound about a bobbin and the like and contained in a casing. As discussed above, since the higher order mode dispersion compensating fiber has a considerably large dispersion index, reduction in winding length, downsizing of the module, and cost reduction can be achieved. Also, the module has a multipass interference of 45 dB or greater because of a significant loss in a lower order mode.

Figure 3:
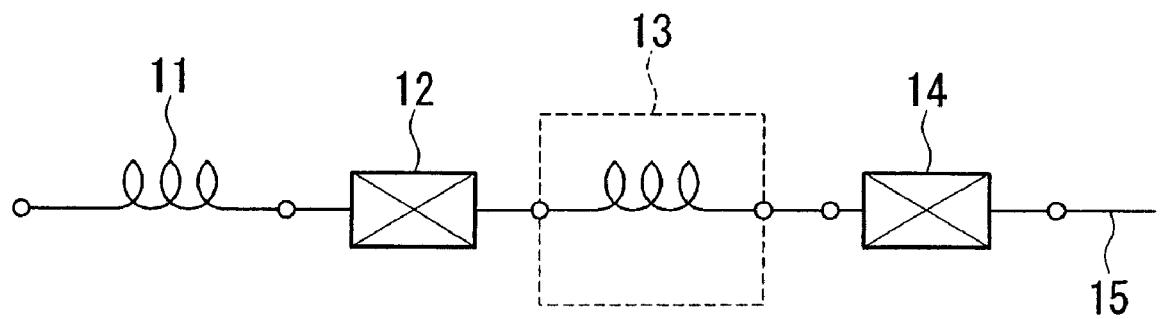
FIG. 3 is a schematic diagram showing a configuration of a dispersion-compensated optical transmission path employing a dispersion compensating module according to the present invention.

FIG. 3 shows an example of a dispersion-compensated optical transmission path employing the dispersion compensating module according to the present invention.

In FIG. 3, reference numeral 11 is an optical transmission path including a single mode fiber which exhibits zero dispersion at a wavelength of 1.3 μm and a dispersion of +17 ps/nm/km at 1.55 μm.

An output port of the optical transmission path II is coupled to an input port of a first mode converter 12. The first mode converter 12 can convert the fundamental $LP_{01}$ mode propagated through the optical transmission path 11 composed of a single mode fiber to a higher order mode, e.g., the $LP_{02}$ mode. A long period fiber grating or holey fiber may be used as the mode converter 12.

An output port of the first mode converter 12 is coupled to an input port of the above-mentioned dispersion compensating module indicated by reference numeral 13, and an output port of the dispersion compensating module 13 is coupled to an input port of a second mode converter 14. The second mode converter 14 converts a higher order mode, e.g., the $LP_{02}$ mode, propagated through the dispersion compensating module 13, to the fundamental $LP_{01}$ mode, like the first mode converter 12, a holey fiber or long period fiber grating can be employed for the second mode converter 14.

An output port of the second mode converter 14 is coupled to another optical transmission path 15 or a light amplifier and the like.

An optical signal at a wavelength of 1.55 μm in a fundamental mode (the $LP_{01}$ mode) entering the input port of the optical transmission path 11 is sent from the output port thereof to the first mode converter 12, where the signal is mode-converted to a higher order mode, e.g., the $LP_{02}$ mode. The light signal which has been converted to the $LP_{02}$ mode by the first mode converter 12 enters the dispersion compensating module 13, where the chromatic dispersion accumulated across the optical transmission path 11 is compensated and then sent to the second mode converter 14.

The second mode converter 14 converts the propagation mode of the signal light from the higher order mode, e.g., the $LP_{02}$ mode, to the fundamental $LP_{01}$ mode, and then the signal is sent to the other optical transmission path 15 or the light amplifier.

The length of the dispersion compensating fiber of the dispersion compensating module 13 is determined so that the chromatic dispersion at 1.55 μm accumulated across the optical transmission path 11 is canceled. For example, when the optical transmission path 11 has a length of 80 km, and the single mode fiber employed in the optical transmission path 11 exhibits a dispersion of +17 ps/nm/km at a wavelength of 1.55 μm, the accumulated dispersion across the optical transmission path 11 becomes 80×17=1360 ps/nm.

When a higher order mode dispersion compensating fiber having a dispersion of −1000 ps/nm/km at 1.55 μm is used for the dispersion compensating module 13 and the winding length of the dispersion compensating fiber used for the dispersion compensating module 13 is 1.36 km, the accumulated dispersion across the optical transmission path 11 at 1.55 μm can be completely compensated.

Examples of the present invention will now be described.

EXAMPLE 1

Figure 4:
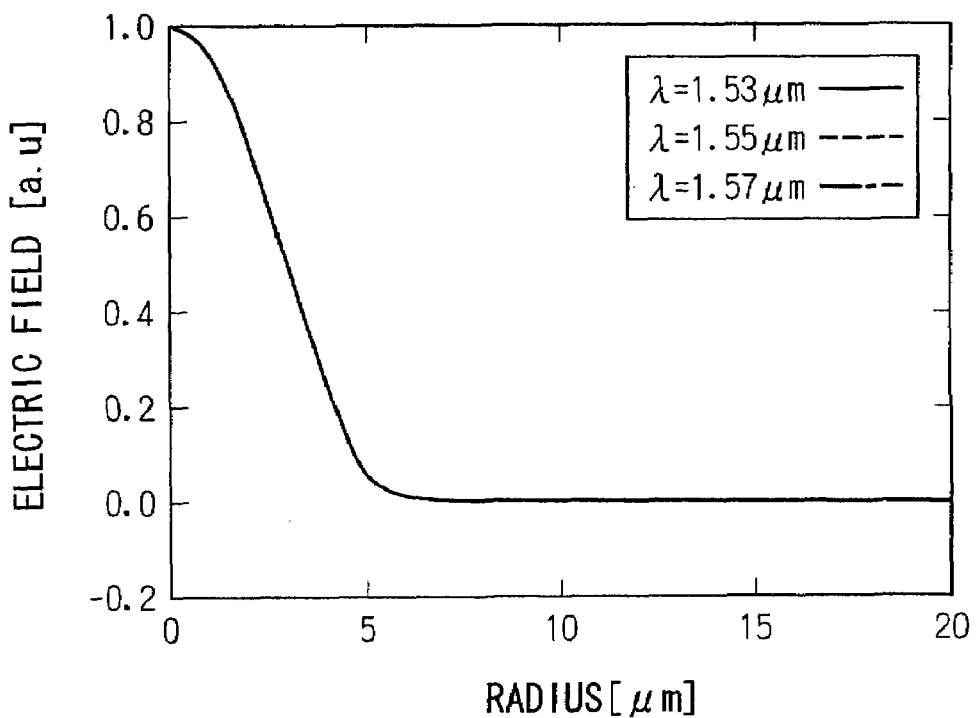
FIG. 4 is a graph showing the electric field distribution of a dispersion compensating fiber of Example 1 in the $LP_{01}$ mode.

A higher order mode dispersion compensating fiber having the structural parameters shown in Example 1 of Table 1 was fabricated by modified chemical vapor deposition. This dispersion compensating fiber could propagate the $LP_{01}$, the $LP_{02}$, and the $LP_{03}$ modes. The electric field distribution in the $LP_{01}$ mode is shown in FIG. 4, the electric field distribution in the $LP_{02}$ mode in FIG. 5, and the electric field distribution in the $LP_{03}$ mode is in FIG. 6.

Figure 7:
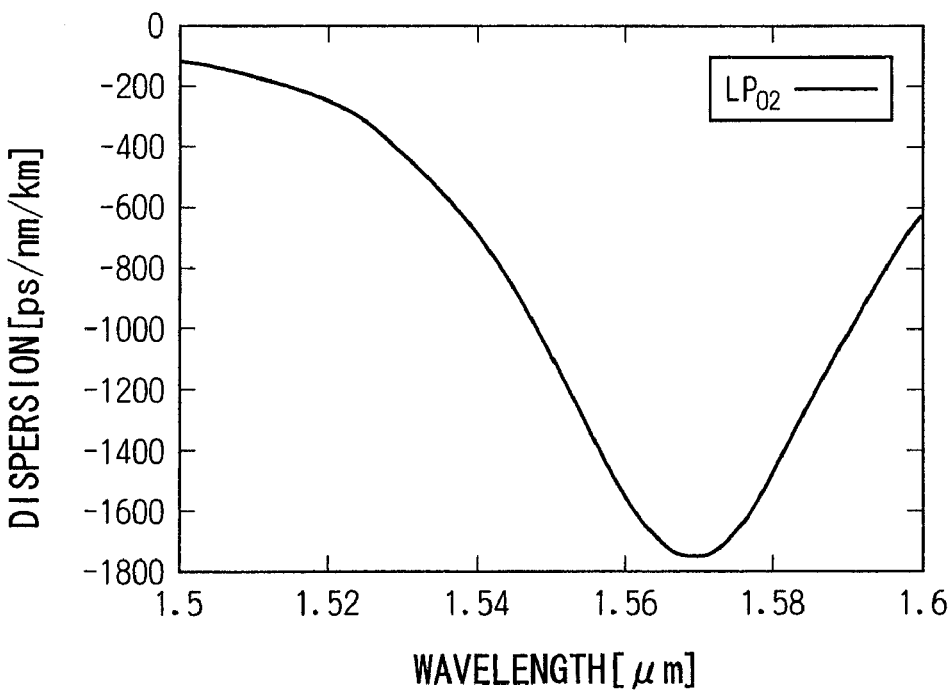
FIG. 7 is a graph showing the dispersion characteristic of the dispersion compensating fiber of Example 1.

The dispersion characteristics in the $LP_{02}$ mode is shown in FIG. 7. As can be seen in FIG. 7, the dispersion at a wavelength of 1.55 μm is approximately −1100 ps/nm/km.

TABLE 1

|  | Example 1 | Example 2 |
|---|---|---|
| 2a (μm) | 8.36 | 8.40 |
| 2b (μm) | 14.60 | 14.50 |
| 2c (μm) | 27.00 | 26.00 |
| Δ1 | 0.0227 | 0.0181 |
| Δ2 | −0.0020 | 0.0000 |
| Δ3 | 0.0077 | 0.0039 |

Figure 5:
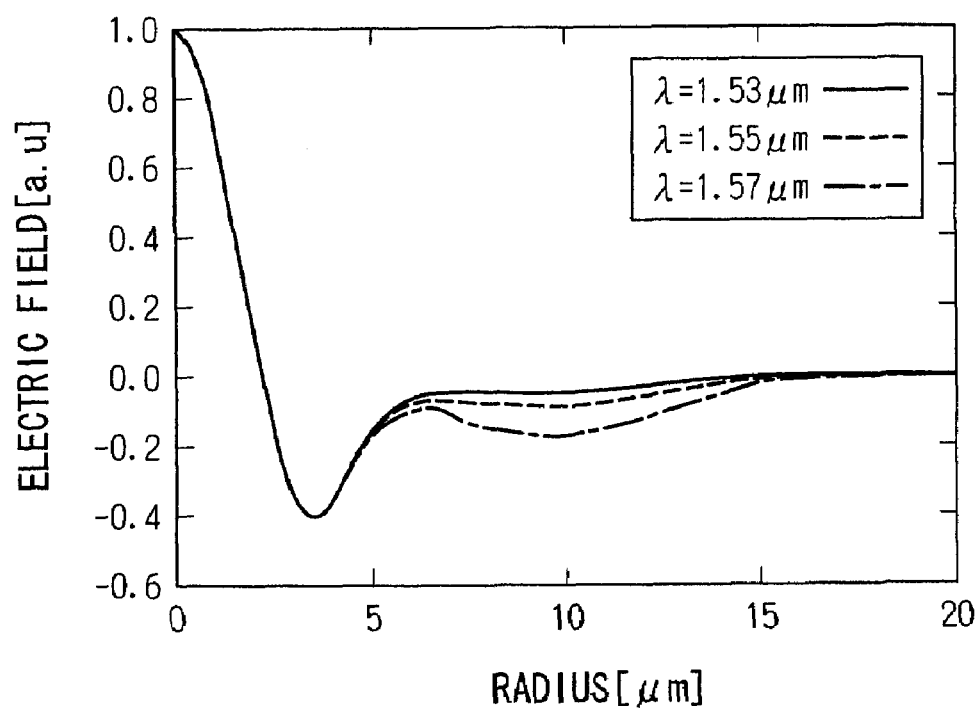
FIG. 5 is a graph showing the electric field distribution of the dispersion compensating fiber of Example 1 in the $LP_{02}$ mode.
Figure 6:
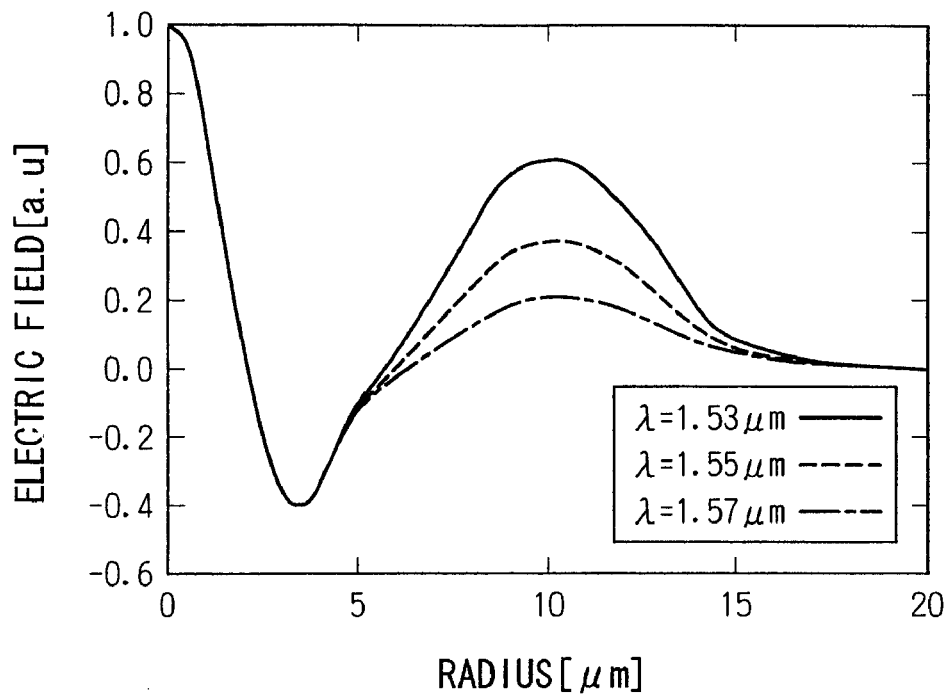
FIG. 6 is a graph showing the electric field distribution of the dispersion compensating fiber of Example 1 in the $LP_{03}$ mode.

In FIG. 5 showing the electric field distribution of the $LP_{02}$ mode, a loss layer was provided at the position where the electric field becomes zero in the electric field distribution profile, at a radial distance of 2.20 μm from the center. The loss layer was formed by doping 16.3 mole % of boron trioxide ($B_2O_3$) into germanium-doped silica of which the central core region is made, and the thickness of the layer is 0.2 μm.

Figure 8:
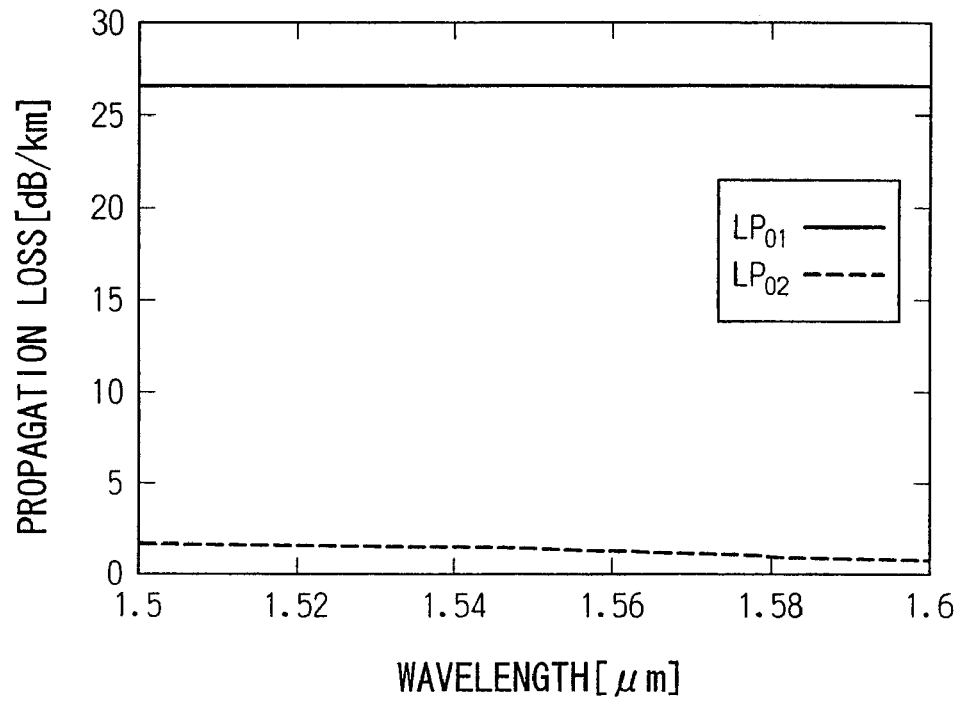
FIG. 8 is a graph showing the propagation loss of the dispersion compensating fiber of Example 1 in each mode.

The propagation losses in the two modes are shown in FIG. 8 where A of Formula (1) was 150 dB/km, and B was 0.5 dB/km. As can be seen in FIG. 8, the loss in the $LP_{01}$ mode is approximately 26.5 dB/km but approximately 1.5 dB/km in the $LP_{02}$ mode.

Table 2 shows the results of compensation of the accumulated dispersion at 1.55 μm over the optical transmission path by a dispersion compensating module employing an 80 km single mode fiber having a dispersion of +17 ps/nm/km at a wavelength of 1.55 μm.

Table 2 compares the characteristics of optical transmission paths having three types of dispersion compensating fibers: a dispersion compensating fiber with the above-mentioned loss layer using the $LP_{02}$ mode, a dispersion compensating fiber using the $LP_{02}$ mode without a loss layer, and a conventional dispersion compensating fiber using the $LP_{01}$ mode. Three types of dispersion compensating modules were fabricated using the above three fibers in the configuration shown in FIG. 3 and their characteristics were compared.

TABLE 2

| Mode Converter | Conventional DCF | HOM-DCF with Loss Layer | | HOM-DCF without Loss Layer | |
|---|---|---|---|---|---|
| | | Holey fiber | LPG | Holey fiber | LPG |
| Dispersion [ps/nm/km] | −80 | −1100 | | −1100 | |
| Employed Mode Insertion Loss [dB/km] | 0.35 | 1.5 | | 0.50 | |
| Unnecessary Mode Insertion Loss [dB/km] | — | 26.5 | | 0.50 | |
| Length [km] | 17.0 | 1.24 | | 1.24 | |
| Employed Mode Splice Loss [dB/Conn.] | 0.50 | 2.0 | 0.23 | 2.0 | 0.23 |
| Unnecessary Mode Splice Loss [dB/Conn.] | — | 9.0 | 13.0 | 9.0 | 13.0 |
| Employed Mode Total Loss [dB/km] | 6.95 | 5.86 | 2.32 | 4.62 | 1.08 |

TABLE 2-continued

|  | HOM-DCF with Loss Layer | | HOM-DCF without Loss Layer | |
|---|---|---|---|---|
| Mode Converter Conventional DCF | Holey fiber | LPG | Holey fiber | LPG |
| FOM [ps/nm/km] 196 | 232 | 586 | 294 | 1259 |
| MPI [dB] — | 45.0 | 56.5 | 14.0 | 25.5 |

In Table 2, FOM (Figure of Merit) was determined by dividing the dispersion of all of the dispersion-compensated optical transmission paths by the overall loss including the loss of the two mode converters, and MPI (multipass interference) is the difference between the overall insertion loss in the $LP_{01}$ mode and the overall insertion loss in the $LP_{02}$ mode in the dispersion-compensated optical transmission path. In Table 2, the values of splice loss are for one mode converter. The employed mode is the $LP_{02}$ mode and the unnecessary mode is the $LP_{01}$ mode.

The results listed in Table 2 clearly show that both FOM and MPI are greatly improved in a dispersion compensating fiber using the $LP_{02}$ mode having a loss layer.

EXAMPLE 2

Figure 9:
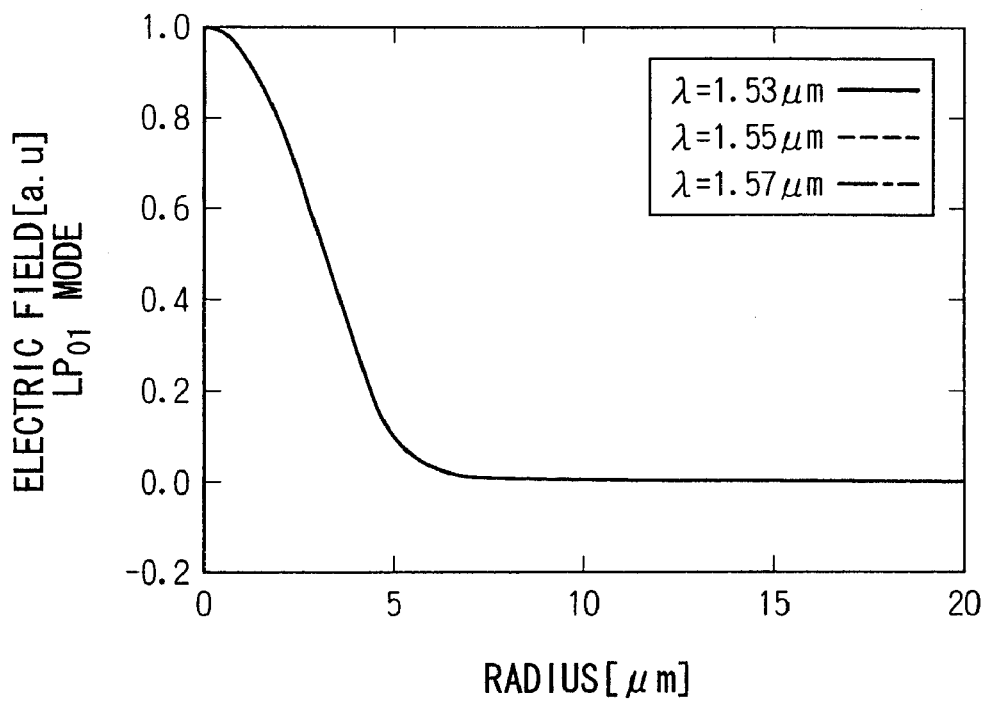
FIG. 9 is a graph showing the electric field distribution of a dispersion compensating fiber of Example 2 in the $LP_{01}$ mode.

A higher order mode dispersion compensating fiber having the structural parameters shown in Example 2 of Table 1 was fabricated by modified chemical vapor deposition. This dispersion compensating fiber could propagate the $LP_{01}$, the $LP_{02}$, and the $LP_{03}$ modes. The electric field distribution in the $LP_{01}$ mode is shown in FIG. 9, the electric field distribution in the $LP_{02}$ mode in FIG. 10, and the electric field distribution in the $LP_{03}$ mode is in FIG. 11.

Figure 12:
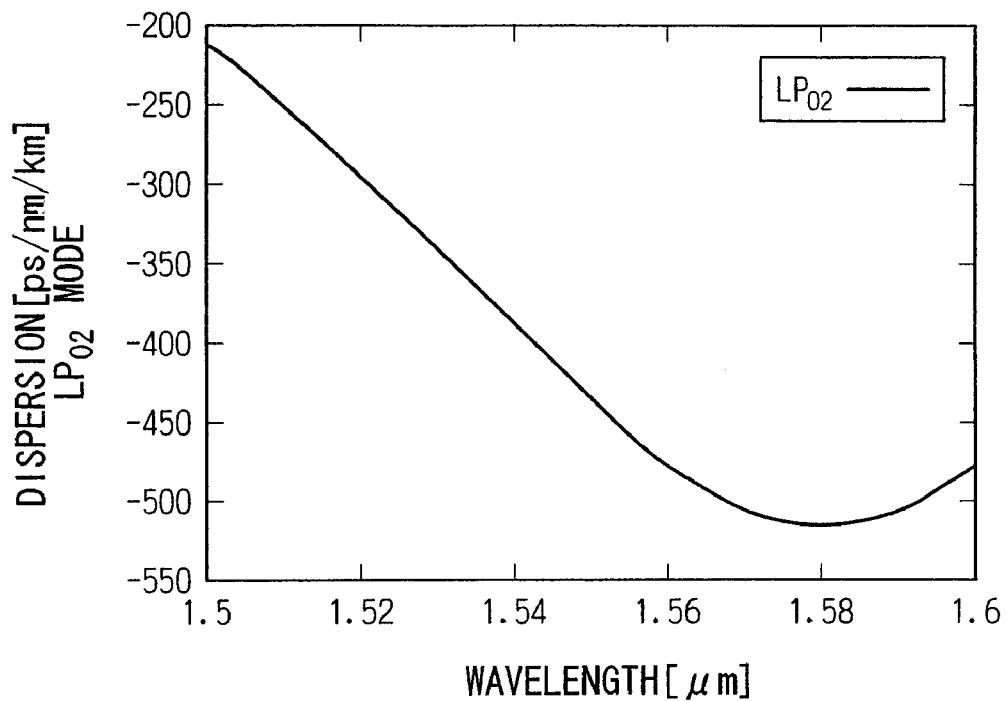
FIG. 12 is a graph showing the dispersion characteristic of the dispersion compensating fiber of Example 2.

The dispersion characteristic in the $LP_{02}$ mode is shown in FIG. 12. As can be seen in FIG. 12, the dispersion at a wavelength of 1.55 μm is approximately −440 ps/nm/km.

Figure 10:
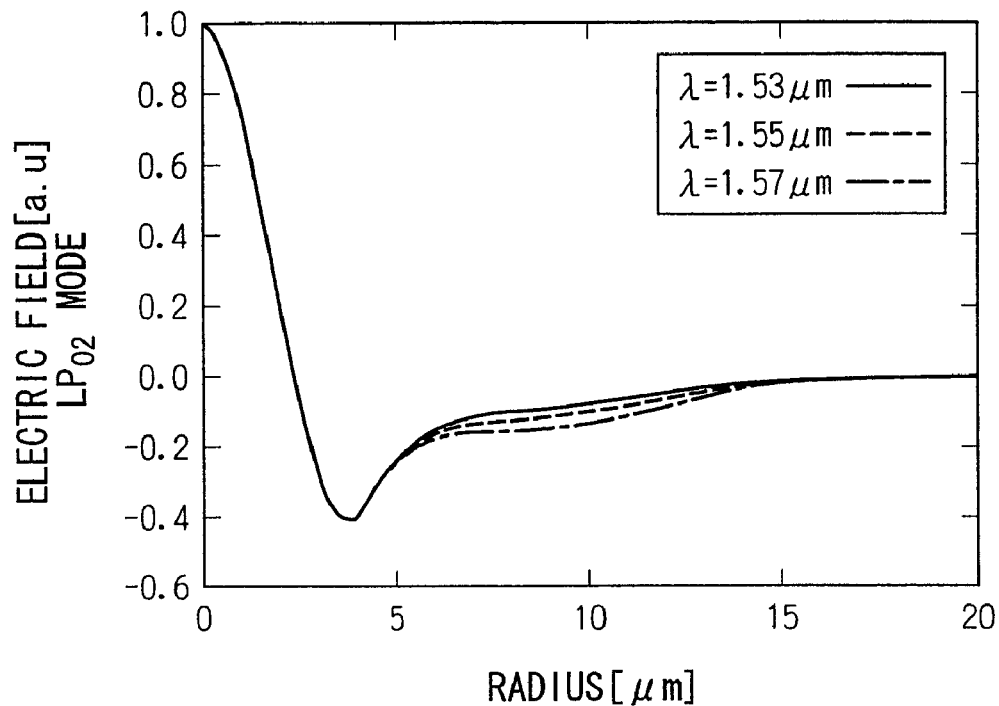
FIG. 10 is a graph showing the electric field distribution of the dispersion compensating fiber of Example 2 in the $LP_{02}$ mode.
Figure 11:
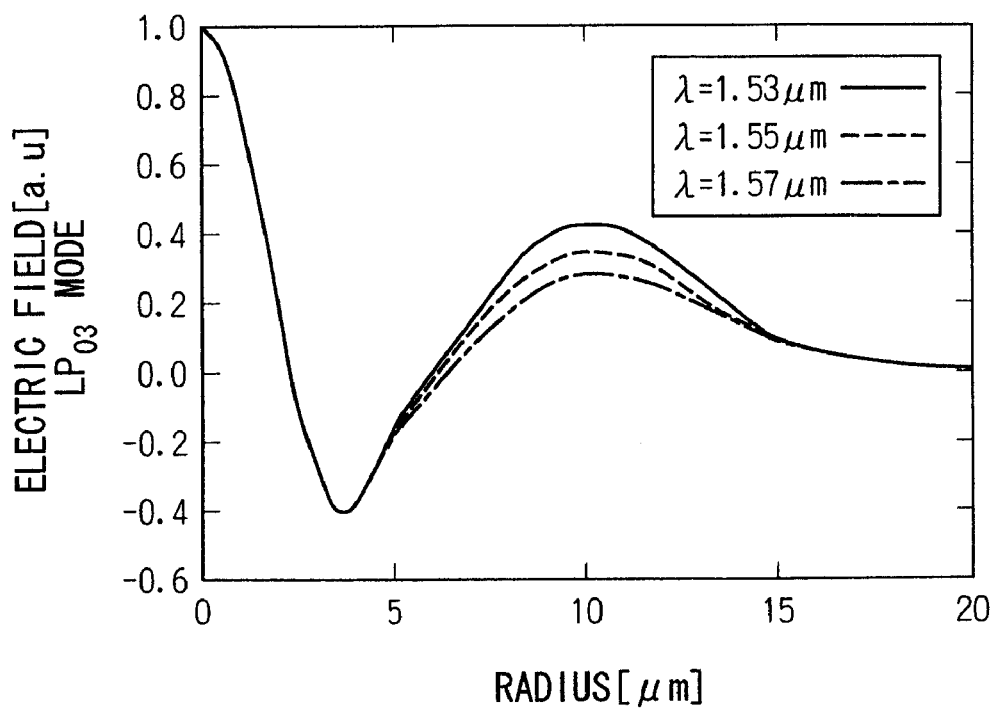
FIG. 11 is a graph showing the electric field distribution of the dispersion compensating fiber of Example 2 in the $LP_{03}$ mode.

In FIG. 10 showing the electric field distribution of the $LP_{02}$ mode, a loss layer was provided at the position where the electric field becomes zero in the electric field distribution profile, at a radial distance of 2.30 μm from the center. The loss layer was formed by doping 7.6 mole % of boron trioxide into germanium-doped silica of which the central core region is made, and the thickness of the layer is 0.2 μm.

Figure 13:
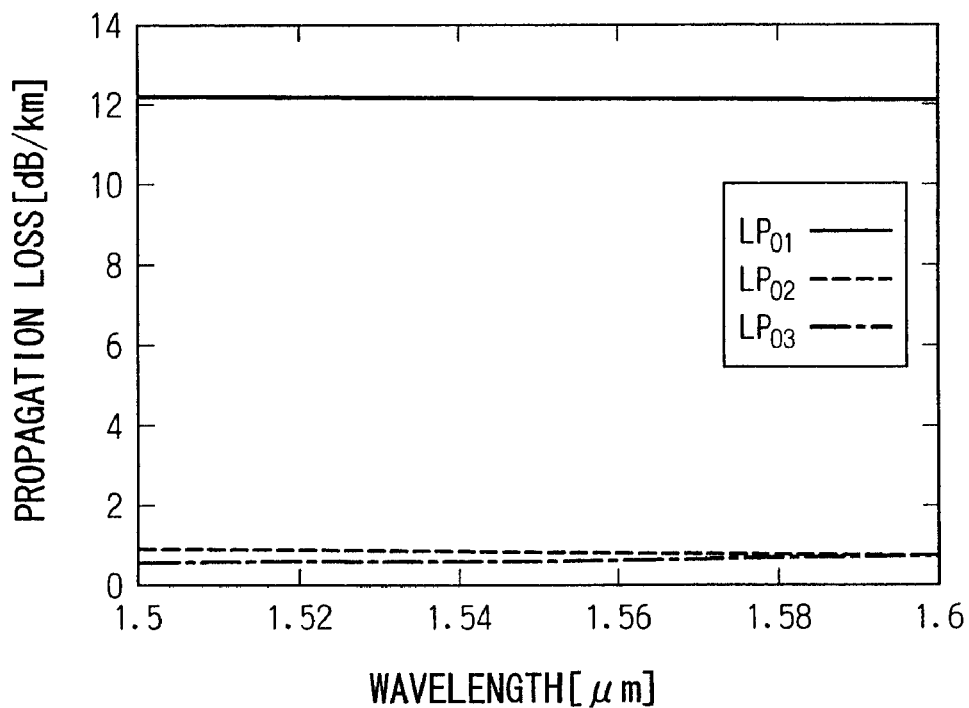
FIG. 13 is a graph showing the propagation loss of the dispersion compensating fiber of Example 2 in each mode.

The propagation losses in the two modes are shown in FIG. 13 were A and B of Formula (1) were 70 dB/km and 0.5 dB/km, respectively. As can be seen in FIG. 13, the loss in the $LP_{01}$ mode is approximately 12.1 dB/km but approximately 0.83 dB/km in the $LP_{02}$ mode.

Similar to Table 2 in Example 1, Table 3 shows the results of compensation of the accumulated dispersion at 1.55 μm over the optical transmission path by a dispersion compensating module employing an 80 km single mode fiber having a dispersion of +17 ps/nm/km at a wavelength of 1.55 μm.

Table 3 also compares the characteristics of optical transmission paths having three types of dispersion compensating fibers: a dispersion compensating fiber with the above-mentioned loss layer using the $LP_{02}$ mode, a dispersion compensating fiber using the $LP_{02}$ mode without a loss layer, and a conventional dispersion compensating fiber using the $LP_{01}$ mode. Three types of dispersion compensating modules were fabricated using the above three fibers in the configuration shown in FIG. 3 and their characteristics were compared.

TABLE 3

|  |  | HOM-DCF with Loss Layer | | HOM-DCF without Loss Layer | |
|---|---|---|---|---|---|
| Mode Converter | Conventional DCF | Holey fiber | LPG | Holey fiber | LPG |
| Dispersion [ps/mn/km] | −80 | −440 | | −440 | |
| Employed Mode Insertion Loss [dB/km] | 0.35 | 0.83 | | 0.50 | |
| Unnecessary Mode Insertion Loss [dB/km] | — | 12.1 | | 0.50 | |
| Length [km] | 17.0 | 3.09 | | 3.09 | |
| Employed Mode Splice Loss [dB/Conn.] | 0.50 | 2.0 | 0.23 | 2.0 | 0.23 |
| Unnecessary Mode Splice Loss [dB/Conn.] | — | 9.0 | 13.0 | 9.0 | 13.0 |
| Employed Mode Total Loss [dB/km] | 6.95 | 6.56 | 3.02 | 5.55 | 2.01 |
| FOM [ps/nm/km] | 196 | 207 | 450 | 245 | 677 |
| MPI [dB] | — | 48.8 | 60.4 | 14.0 | 25.5 |

The results listed in Table 3 clearly show that both FOM and MPI are greatly improved in a dispersion compensating fiber using the $LP_{02}$ mode having a loss layer.

As described above, by providing a loss layer which inhibits propagation of a lower order mode, e.g., the $LP_{01}$ mode, but allows propagation of a higher order mode, e.g., the $LP_{02}$ mode, in the higher order mode dispersion compensating fiber of the present invention, loss of the higher order $LP_{02}$ mode during propagation is inhibited while the lower order $LP_{01}$ mode experiences a large loss. Thus, multipass interference can be greatly improved.

Therefore, when a higher order mode dispersion compensating fiber is used for dispersion compensation, even if a mode converter with a relatively poor conversion characteristic which is indispensable for the conversion is used, the dispersion compensating fiber of the present invention provides excellent multipass interference since propagation of unnecessary modes, e.g., the $LP_{01}$ mode, is almost completely eliminated in the dispersion compensating fiber.

Furthermore, by utilizing a higher order mode, a large dispersion index is realized, thereby the fiber length required for compensation can be reduced. Furthermore, since the fiber has a wide effective core area, signal light having high optical power is not affected by a nonlinear effect.

However, in the dispersion compensating fiber using a loss layer described above, the wavelength dependence of propagation loss becomes large in a higher order mode, e.g., the $LP_{02}$ mode, and the loss increases in a short wavelength region.

Figure 23:
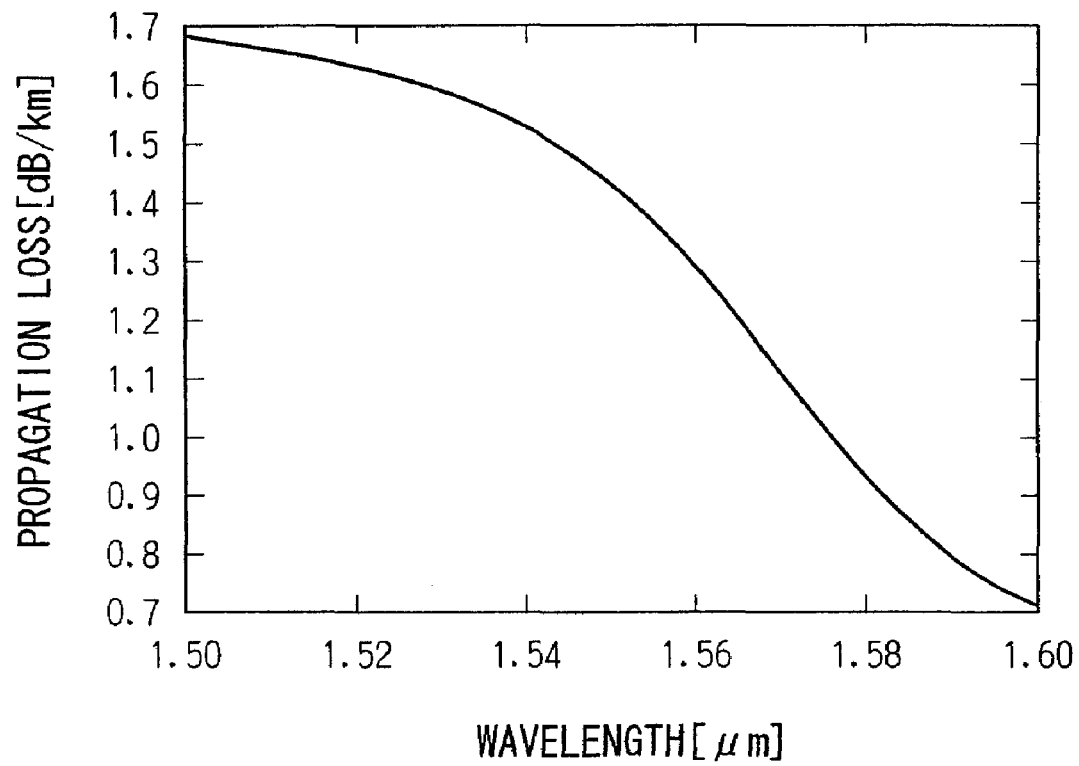
FIG. 23 is a graph showing the wavelength dependence of the propagation loss of a dispersion compensating fiber.

FIG. 23 shows the relationship between propagation losses and wavelengths of a dispersion compensating fiber which includes a loss layer at a radial distance of 2.20 μm from the center with a thickness of 0.2 μm, a peak attenuation of 150 dB/km, and a background loss of 0.5 dB/km, and which has been formed by doping with cobalt.

As can be seen in FIG. 23, the maximum change in loss is approximately 1 dB/km in a wavelength region between 1.5 μm and 1.6 μm. In the dispersion compensating fiber having such a loss layer, the difference of propagation losses between the $LP_{01}$ and the $LP_{02}$ modes can be reduced to approximately 25 dB, thereby propagation of lower order modes is sufficiently reduced. Two loss layers are provided in a higher order mode dispersion compensating fiber to diminish the wavelength dependence of propagation loss in a higher order mode.

Second Embodiment

A second embodiment of the present invention which solves the second problem mentioned above will now be described in greater detail.

Figure 14:
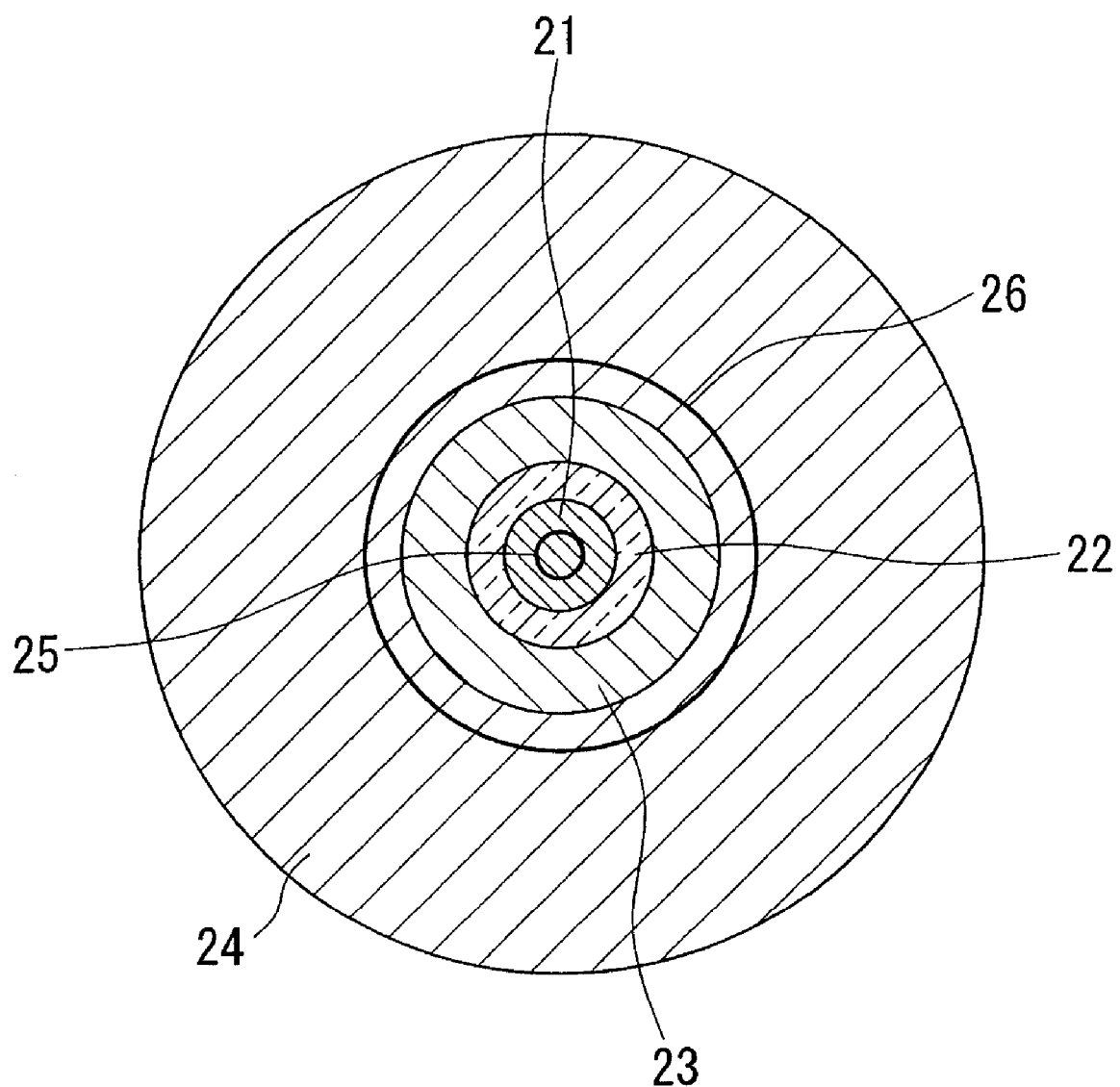
FIG. 14 is a schematic cross-sectional view showing an example of a higher order mode dispersion compensating fiber according to the present invention.
Figure 15:
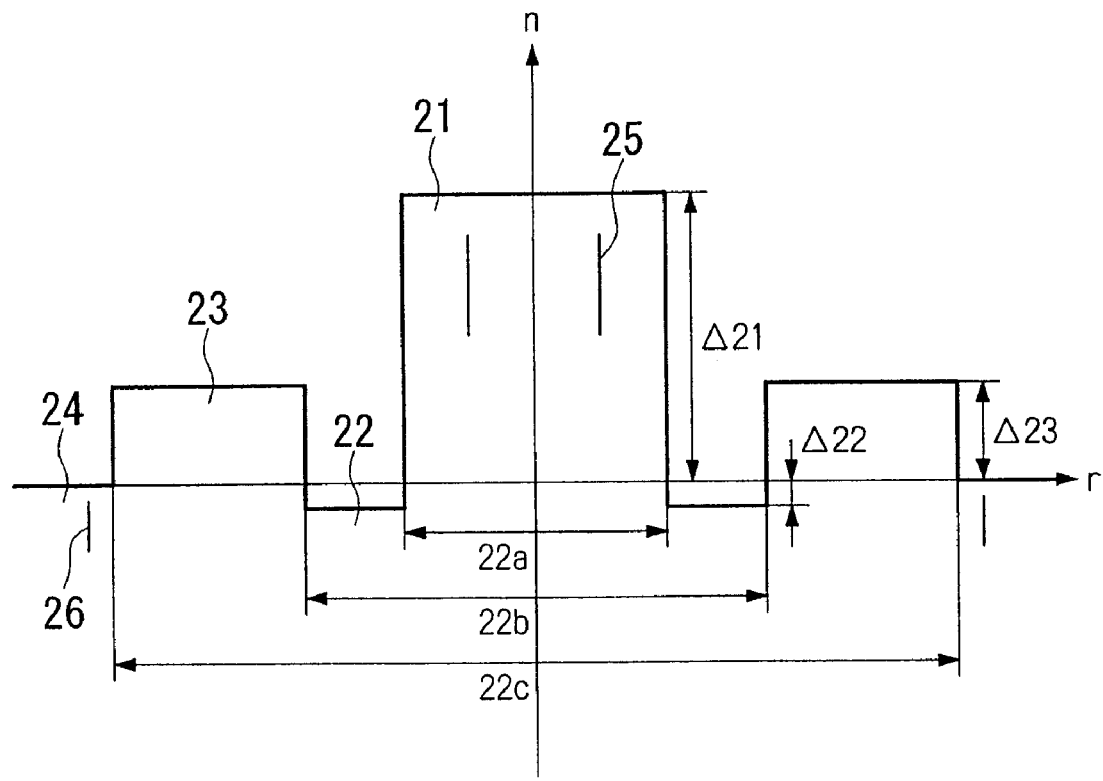
FIG. 15 shows an example of a refractive index distribution profile of a higher order mode dispersion compensating fiber according to the present invention.

FIG. 14 is a schematic cross sectional view illustrating a exemplary higher order mode dispersion compensating fiber according to the present invention, and FIG. 15 is a schematic view of the refractive index profile of the fiber shown in FIG. 1.

In FIG. 14, reference numerals 21, 22, 23, and 24 refer to a central core region, a core region, a ring core region, and a cladding, respectively.

The central core region 21 has the highest refractive index, and is made of glass, such as germanium-doped silica; its relative refractive index difference $\Delta_{21}$ ranges from 0.005 to 0.026, and its external diameter 22a ranges from 5 µm to 16 µm.

The core region 22 is provided outside the central core region 21, and its refractive index is lower than those of the central core region 21 and the cladding 24. The core region is made of glass such as fluorine-doped silica; its relative refractive index difference $\Delta_{22}$ ranges from −0.01 to +0.006, and its external diameter 22b ranges from 8 µm to 20 µm.

The ring core region 23 is provided outside the core region 22, and its refractive index is lower than that of the central core region 21 and higher than those of the core region 22 and the cladding 24. The ring core region 23 is made of glass, such as germanium-doped silica; its relative refractive index difference $\Delta_{23}$ ranges from −0.007 to +0.015, and its external diameter 22c ranges from 12 µm to 34 µm.

The cladding 24 is provided outside the ring core region 23, and its refractive index is lower than that of the ring core region 23 and higher than that of the core region 22. The cladding 24 is made of glass such as pure silica, and its external diameter is 125 µm.

As shown in FIG. 14, an annular first loss layer 25 is provided inside the central core region 21 of the higher order mode dispersion compensating fiber, and an annular second loss layer 26 is provided inside the cladding 24. In FIG. 15, the first and second layers indicated by reference numerals 25 and 26 are shown just to illustrate the position of the loss layers, and it is not intended to show the actual refractive index of the loss layers 25 and 26.

The first loss layer 25 inhibits propagation in a fundamental mode, e.g., the $LP_{01}$ mode while allowing propagation in a higher order mode, e.g., the $LP_{02}$ mode.

The first loss layer 25 is a layer made of glass, such as silica doped with at least one element selected from the group consisting of cobalt, chromium, copper, iron, nickel, manganese, boron, and vanadium.

The maximum loss occurring only in the first loss layer 25 is somewhere between 100 dB/km and 200 dB/km.

The first loss layer 25 is thin with a thickness of 0.5 µm or less so as not to incur a decrease in the transmission loss in the fiber as a whole.

Furthermore, the first loss layer 25 is provided at the point where the electric field intensity in the electric field distribution profile becomes zero. This "zero electric field intensity point" corresponds to a "node" in the electric field distribution of the $LP_{02}$ mode at which the propagation of the $LP_{02}$ mode is not affected.

The second loss layer 26 diminishes the wavelength dependence of the propagation loss in a higher order mode, e.g., the $LP_{02}$ mode.

The second loss layer 26 is a layer made of glass, such as silica doped with at least one element selected from the group consisting of cobalt, chromium, copper, iron, nickel, manganese, boron, and vanadium.

The maximum loss occurring only in the second loss layer 26 is somewhere between 10 dB/km and 20 dB/km.

The first loss layer 26 is thin with a thickness of 1 µm or less so as not to incur a decrease in the transmission loss in the fiber as a whole.

The second loss layer 26 is provided near the third "loop" of a higher order mode, e.g., the $LP_{02}$ mode, and is usually located inside the cladding 24 outside of the first loss layer 25.

With an increase in wavelength, the electric field distribution of the $LP_{02}$ mode, a higher order mode, increases in the third loop. Therefore, providing the second loss layer 26 at this point results in an increase in the mode loss. Thus, by optimizing the position, thickness, and loss of the second loss layer 26, the loss characteristic of the $LP_{02}$ mode can be flattened.

The loss, thickness, and positions of the first and second loss layers 25 and 26 can be determined by Formula (3):

$$P_m(r) = A_1 \exp\left[-\left(\frac{r-r_1}{2\sqrt{2}\,\Delta r_1}\right)^2\right] + A_2 \exp\left[-\left(\frac{r-r_2}{2\sqrt{2}\,\Delta r_2}\right)^2\right] + B \quad (3)$$

where Pm(r) is material loss in the fiber profile, $A_1$ is the peak attenuation in the first loss layer (dB/km), $A_2$ is the peak attenuation in the second loss layer (dB/km), B is loss in the other layers (dB/km), $r_1$ is a radial distance of the middle point between the top and the bottom of the first loss layer, $r_2$ is a radial distance of the middle point between the top and the bottom of the second loss layer, $\Delta r_1$ is a full width at half maximum (FWHM) of loss in the first loss layer (dB), and $\Delta r_2$ is a FWHM of loss in the second loss layer (dB), provided that the loss layers are thin enough and the loss exhibits a Gaussian distribution.

The propagation losses in the lower and higher order modes are obtained from Formula (4):

$$P_l = \frac{\int_0^\infty r P_m(r) R^2(r) dr}{\int_0^\infty r R^2(r) dr} \quad (4)$$

where Pl is the propagation loss in each mode (dB/km) and R is the transverse electromagnetic field function when an LP mode is approximated, the calculation of which is described in K Okamoto, "Comparison of calculated and measured impulse responses of optical fibers", Appl. Opt., Vol. 18, pp. 2199-2206, 1979.

Based on Formulas (3) and (4), structural parameters of the first and the second loss layers 25 and 26 which provide the desired properties can be determined.

A dispersion compensating fiber having such first and second loss layers 25 and 26 can be fabricated by modified chemical vapor deposition. More specifically, the desired first and second loss layers 25 and 26 can be formed at the target positions by adjusting various conditions. Such conditions include, but are not limited to, the timing when a dopant gas composed of a compound containing at least one of the elements mentioned above is added or supplied to glass source material gas, such as silicon tetrachloride or germanium chloride, which is introduced into a silica tube, the starting substrate, how long the dopant gas is supplied, the amount of the dopant, and the concentration of the doped element in the dopant gas.

In the higher order mode dispersion compensating fiber according to the present invention, the first loss layer 25 allows propagation of a higher order mode, e.g., the $LP_{02}$ mode while substantially inhibiting propagation of a lower order mode, e.g., the $LP_{01}$ mode. The loss in the lower mode is 10 dB/km or greater, and preferably, but not necessarily, 20 dB/km or more, which is eight or more times larger than the loss in the higher order mode. Although propagation of a further higher order mode, e.g., the $LP_{03}$ mode, may occur, the bending loss becomes significant. Therefore, when the fiber is used in a module, the propagation loss becomes significant and almost all of the propagation is eliminated to a practically acceptable level.

As a result, only a higher order mode, e.g., the $LP_{02}$ mode, is propagated through the dispersion compensating fiber. Therefore, modes which have not been converted during the conversion from a fundamental mode to a higher order mode (the $LP_{02}$ mode), for example, the $LP_{01}$ mode, are not propagated at the practically acceptable level, thus multipass interference is minimized. Since the ratio of loss of a higher order mode to loss of a lower order mode depends on the length of the fiber, the multipass interference can be adjusted by changing the length of the fiber.

As disclosed in U.S. Pat. No. 5,802,234, the higher order mode dispersion compensating fiber according to the present invention has a large dispersion index and a large effective core area; it has a chromatic dispersion of −200 ps/nm/km or lower, a chromatic dispersion slope of 0 ps/nm²/km, and an effective core area of 50 μm² or greater.

Therefore, using the dispersion compensating fiber of the present invention, the accumulated dispersion can be compensated even when the fiber is short. Furthermore, it can propagate high power optical signals without significant degradation of the transmission property caused by a nonlinear effect.

Furthermore, in this dispersion compensating fiber, the second loss layer 26 reduces and diminishes the wavelength dependence of the propagation loss in a higher order mode, e.g., the $LP_{02}$ mode, as described in the examples below. More specifically, with an increase in wavelength, the electric field distribution of the $LP_{02}$ mode increases in the third "loop". Therefore, providing the second loss layer 26 at this point results in a flat loss-wavelength characteristic in the $LP_{02}$ mode.

Accordingly, this dispersion compensating fiber has a small maximum difference in loss in the $LP_{02}$ mode, with 0.042 dB/km or less in a wavelength range between 1.5 μm and 1.6 μm, and 0.0012 dB/km or less in a wavelength range between 1.53 μm and 1.565 μm.

Therefore, it eliminates the need for an extra device, e.g., an equalizer, to flatten the loss characteristic at the 1.55 μm band which has currently been used for optical communication and which has been shifted toward a broader band.

A dispersion compensating module according to the present invention is a coil of the desired length of the above-mentioned higher order mode dispersion compensating fiber which is wound about a bobbin and the like and contained in a casing. As discussed above, since the higher order mode dispersion compensating fiber has a considerably large dispersion index, reduction in winding length, downsizing of the module, and cost reduction can be achieved. Also, the module has a multipass interference of 45 dB or greater because of a significant loss in a lower order mode.

Figure 16:
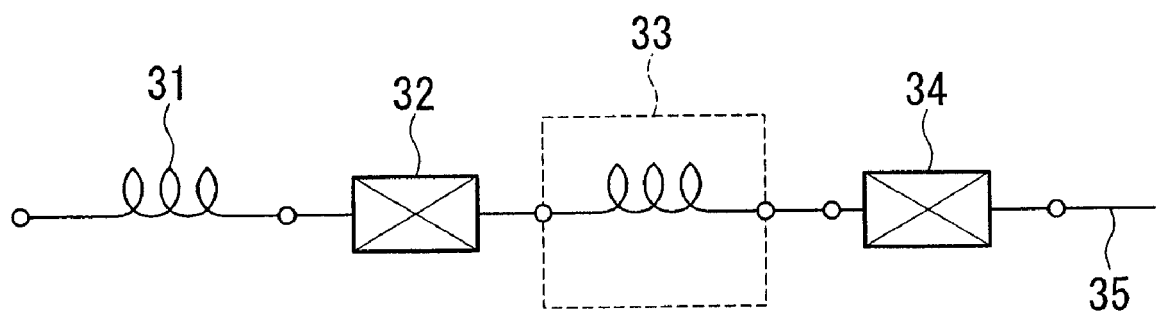
FIG. 16 is a schematic diagram showing a configuration of a dispersion-compensated optical transmission path employing a dispersion compensating module according to the present invention.

FIG. 16 shows an example of the dispersion-compensated optical transmission path employing the dispersion compensating module according to the present invention.

In FIG. 16, reference numeral 31 is an optical transmission path including a single mode fiber which exhibits zero dispersion at a wavelength of 1.3 μm and a dispersion of +17 ps/nm/km at 1.55 μm.

An output port of the optical transmission path 31 is coupled to an input port of a first mode converter 32. The first mode converter 32 can convert the fundamental $LP_{01}$ mode propagated through the optical transmission path 31 composed of a single mode fiber to a higher order mode, e.g., the $LP_{02}$ mode. A long period fiber grating or holey fiber may be used as the mode converter 32.

An output port of the first mode converter 32 is coupled to an input port of the above-mentioned dispersion compensating module indicated by reference numeral 33, and an output port of the dispersion compensating module 33 is coupled to an input port of a second mode converter 34. The second mode converter 34 converts a higher order mode, e.g., the $LP_{02}$ mode, propagated through the dispersion compensating module 33 to the fundamental $LP_{01}$ mode. Like the mode converter 12 mentioned above, a holey fiber or long period fiber grating can be employed for the second mode converter 34.

An output port of the second mode converter 34 is coupled to another optical transmission path 35 or a light amplifier and the like.

An optical signal at a wavelength of 1.55 μm in a fundamental mode (the $LP_{01}$ mode) entering the input port of the optical transmission path 31 is sent from the output port thereof to the first mode converter 32, where the signal is mode-converted to a higher order mode, e.g., the $LP_{02}$ mode. The light signal which has been converted to the $LP_{02}$ mode by the first mode converter 32 enters the dispersion compensating module 33, where the chromatic dispersion accumulated across the optical transmission path 31 is compensated and then sent to the second mode converter 34.

The second mode converter 34 converts the propagation mode of the signal light from the higher order mode, e.g., the $LP_{02}$ mode, to the fundamental $LP_{01}$ mode, and then the signal is sent to the other optical transmission path 35 or the light amplifier.

The length of the dispersion compensating fiber of the dispersion compensating module 33 is determined so that the chromatic dispersion at 1.55 μm accumulated across the optical transmission path 31 is canceled. For example, when the optical transmission path 31 has a length of 80 km, and the single mode fiber employed in the optical transmission path 31 exhibits a dispersion of +17 ps/nm/km at a wavelength of 1.55 μm, the accumulated dispersion across the optical transmission path 31 becomes 80×17=1360 ps/nm.

When a higher order mode dispersion compensating fiber having a dispersion of −1000 ps/nm/km at 1.55 μm is used for the dispersion compensating module 33 and the winding length of the dispersion compensating fiber used for the dispersion compensating module 33 is 1.36 km, the accumulated dispersion across the optical transmission path 31 at 1.55 μm can be completely compensated.

Furthermore, since the dispersion compensating module 33 has a flat loss-wavelength characteristic in the operational frequency band region, an extra device for flattening it is not required for constructing an optical transmission path.

Examples of the present invention will now be described.

EXAMPLE 3

Figure 17:
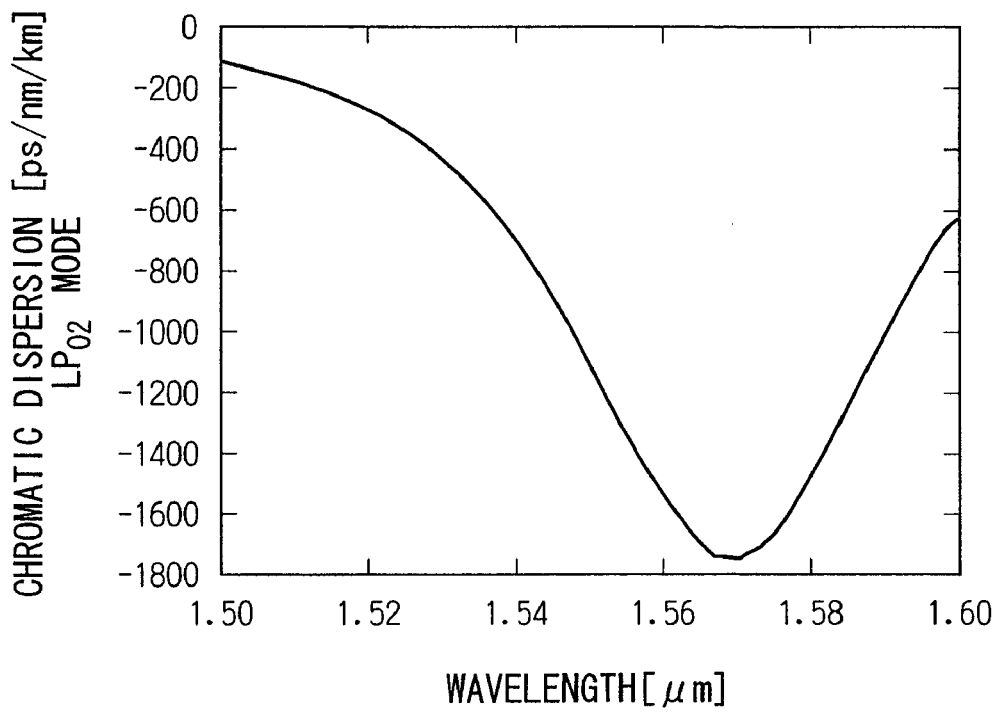
FIG. 17 is a graph showing the dispersion characteristic of a dispersion compensating fiber of Example 3.

A higher order mode dispersion compensating fiber having the structural parameters shown in Example 3 of Table 4 was fabricated by modified chemical vapor deposition. This dispersion compensating fiber could propagate the $LP_{01}$, the $LP_{02}$, and the $LP_{03}$ modes. The dispersion characteristics in the $LP_{02}$ mode are shown in FIG. 17. As can be seen in FIG. 17, the dispersion at a wavelength of 1.55 μm is approximately −1200 ps/nm/km.

TABLE 4

|  | Example 3 | Example 4 |
|---|---|---|
| 2a (μm) | 8.36 | 8.40 |
| 2b (μm) | 14.60 | 14.50 |
| 2c (μm) | 27.00 | 26.00 |
| Δ1 | 0.0227 | 0.0181 |
| Δ2 | −0.0020 | 0.0000 |
| Δ3 | 0.0077 | 0.0039 |

In this dispersion compensating fiber, first and second loss layers were provided by the following procedure. The first loss layer was formed at a radial distance of 2.20 μm from the center by doping 16.8 mole % of boron trioxide ($B_2O_3$) into germanium-doped silica of which the central core region is made with a thickness of 0.2 μm and $A_1$ of 155 dB.

The second loss layer was formed at a radial distance of 8.49 μm from the center by doping 1.3 mole % of boron trioxide ($B_2O_3$) into germanium-doped silica of which the cladding is made with a thickness of 0.3 μm and $A_2$ of 12.1 dB. B was 0.5 dB/km.

Figure 18:
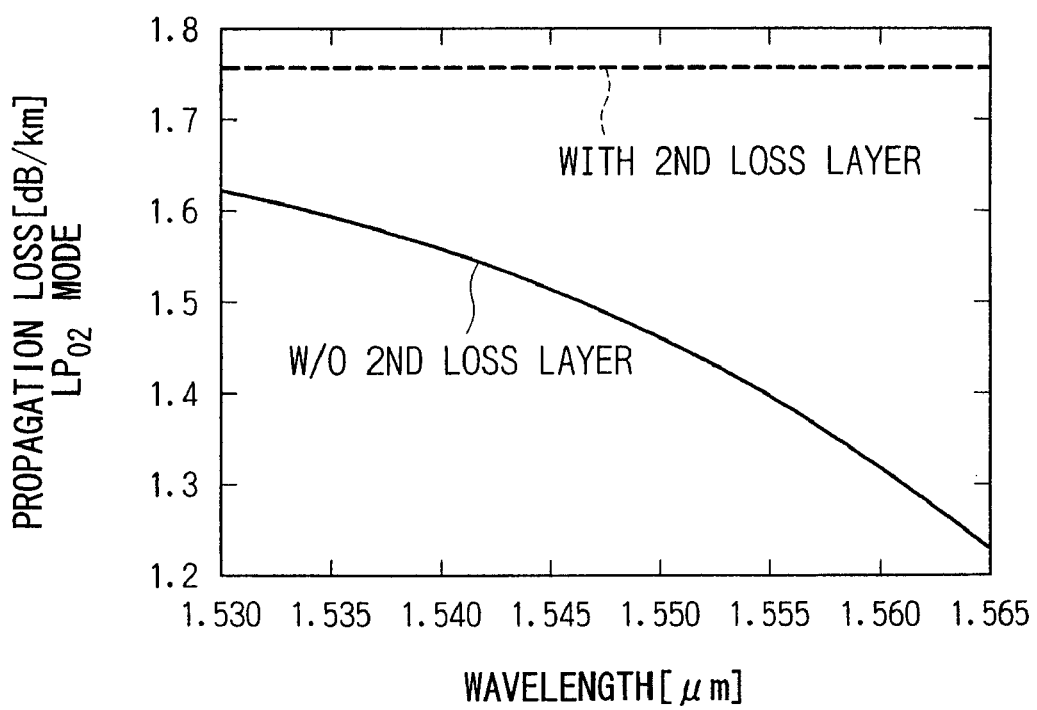
FIG. 18 is a graph showing the wavelength dependence of the propagation loss of the dispersion compensating fiber of Example 3.

In FIG. 18, the wavelength dependence of the propagation loss of the $LP_{02}$ mode in a dispersion compensating fiber having first and second loss layers and a dispersion compensating fiber having only a first loss layer is shown.

As can be seen in FIG. 18, the second loss layer introduced a slight increase in the overall loss, but improves the maximum difference in loss from 0.4 dB/km to 0.0012 dB/km in a wavelength range between 1.53 μm and 1.565 μm.

Table 5 shows the results of compensation of the accumulated dispersion at 1.55 μm over the optical transmission path by a dispersion compensating module employing an 80 km single mode fiber having a dispersion of +17 ps/nm/km at a wavelength of 1.55 μm.

Table 5 compares the characteristics of optical transmission paths having three types of dispersion compensating fibers: a dispersion compensating fiber with the above-mentioned first and second loss layers using the $LP_{02}$ mode, a dispersion compensating fiber using the $LP_{02}$ mode without a loss layer, and a conventional dispersion compensating fiber using the $LP_{01}$ mode. Three types of dispersion compensating modules were fabricated using the above three fibers in the configuration shown in FIG. 16 and their characteristics were compared.

TABLE 5

| Mode Converter | Conventional DCF | HOM-DCF with Loss Layer | | HOM-DCF without Loss Layer | |
|---|---|---|---|---|---|
|  |  | Holey fiber | LPG | Holey fiber | LPG |
| Dispersion [ps/nm/km] | −80 | −1100 | | −1100 | |
| Employed Mode Insertion Loss [dB/km] | 0.35 | 1.76 | | 0.50 | |
| Unnecessary Mode Insertion Loss [dB/km] | — | 27.4 | | 0.50 | |
| Length [km] | 17.0 | 1.24 | | 1.24 | |
| Employed Mode Splice Loss [dB/Conn.] | 0.50 | 2.0 | 0.23 | 2.0 | 0.23 |
| Unnecessary Mode Splice Loss [dB/Conn.] | — | 9.0 | 13.0 | 9.0 | 13.0 |
| Employed Mode Total Loss [dB/km] | 6.95 | 6.18 | 2.64 | 4.62 | 1.08 |
| FOM [ps/nm/km] | 196 | 220 | 515 | 294 | 1259 |
| MPI [dB] | — | 45.8 | 57.3 | 14.0 | 25.5 |

In Table 5, FOM (Figure of Merit) was determined by dividing the dispersion of all of the dispersion-compensated optical transmission paths by the overall loss including the loss of the two mode converters, and MPI (multipass interference) is the difference between the overall insertion loss in the $LP_{01}$ mode and the overall insertion loss in the $LP_{02}$ mode in the dispersion-compensated optical transmission path.

The employed mode is the $LP_{02}$ mode and the unnecessary mode is the $LP_{01}$ mode.

The results listed in Table 5 clearly show that both FOM and MPI are greatly improved in a dispersion compensating fiber using the $LP_{02}$ mode having a loss layer.

Figure 19:
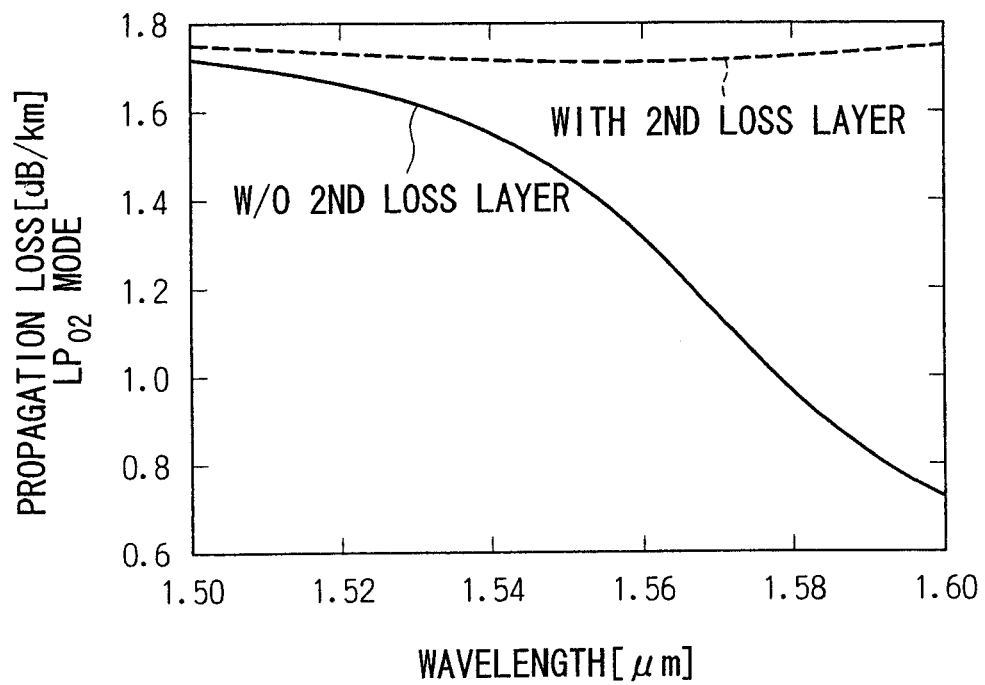
FIG. 19 is a graph showing the wavelength dependence of the propagation loss of another configuration of the dispersion compensating fiber of Example 3.

Furthermore, the wavelength dependence of propagation loss of the dispersion compensating fiber in the $LP_{02}$ mode is shown in FIG. 19. The second loss layer was provided at a radial distance of 9.85 μm from the center with a thickness of 0.9 μm and $A_2$ of 4.04 dB, and was formed by doping 0.44 mole % of boron trioxide ($B_2O_3$) into the silica of which the cladding is made in Example 3.

As can be seen in FIG. 19, the second loss layer improves the maximum difference in loss from 1.0 dB/km to 0.042 dB/km in a wavelength range between 1.5 μm and 1.6 μm. The characteristics of this dispersion compensating fiber are similar to those of the dispersion compensating fiber of Example 3 in Table 5.

EXAMPLE 4

Figure 20:
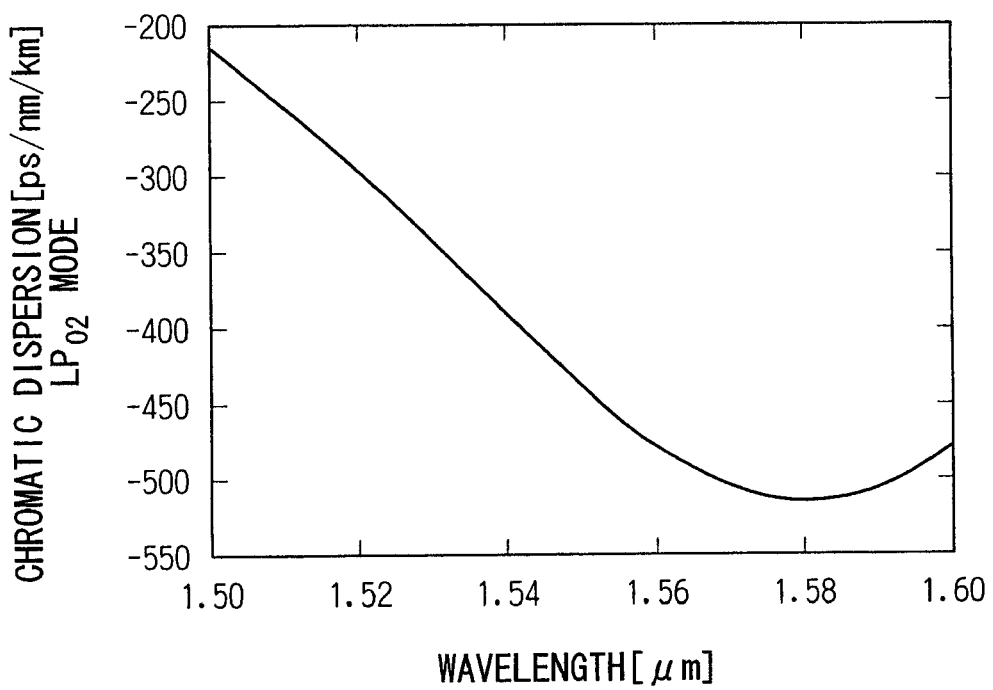
FIG. 20 is a graph showing the dispersion characteristic of a dispersion compensating fiber of Example 4.

A higher order mode dispersion compensating fiber having the structural parameters shown in Example 4 of Table 4 was fabricated by modified chemical vapor deposition. This dispersion compensating fiber could propagate the $LP_{01}$, the $LP_{02}$, and the $LP_{03}$ modes. The dispersion characteristics in the $LP_{02}$ mode are shown in FIG. 20. As can be seen in FIG. 20, the dispersion at a wavelength of 1.55 μm is approximately −440 ps/nm/km.

In this dispersion compensating fiber, first and second loss layers were provided as follows. The first loss layer was formed at a radial distance of 2.30 μm from the center by doping 7.6 mole % of boron trioxide ($B_2O_3$) into germanium-doped silica of which the central core region is made with a thickness of 0.2 μm and $A_1$ of 70 dB.

The second loss layer was formed at a radial distance of 7.92 μm from the center by doping 0.66 mole % of boron trioxide ($B_2O_3$) into germanium-doped silica of which the cladding is made with a thickness of 0.2 μm and $A_2$ of 6.07 dB. B was 0.5 dB/km.

Figure 21:
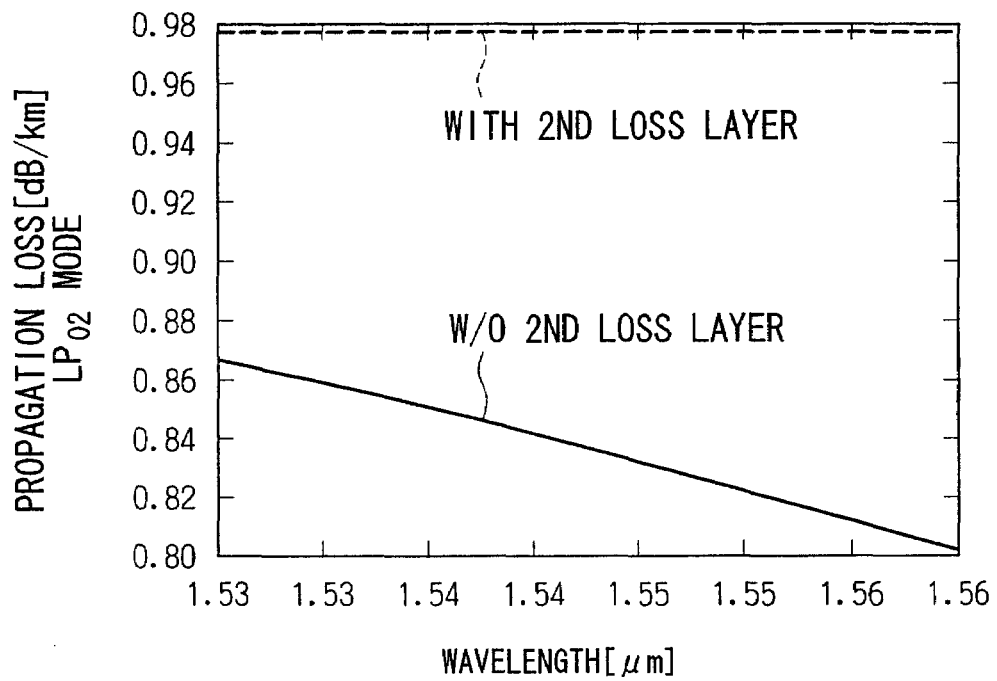
FIG. 21 is a graph showing the wavelength dependence of the propagation loss of the dispersion compensating fiber of Example 4.

In FIG. 21, the wavelength dependence of the propagation loss of the $LP_{02}$ mode in a dispersion compensating fiber having first and second loss layers and a dispersion compensating fiber having only a first loss layer is shown.

As can be seen in FIG. 21, the second loss layer introduced a slight increase in the overall loss, but improves the maximum difference in loss from 0.65 dB/km to 0.0002 dB/km in a wavelength range between 1.53 μm and 1.565 μm.

Table 6 shows the results of compensation of the accumulated dispersion at 1.55 μm over the optical transmission path by a dispersion compensating module employing an 80 km single mode fiber having a dispersion of +17 ps/nm/km at a wavelength of 1.55 μm.

Table 6 compares the characteristics of optical transmission paths having three types of dispersion compensating fibers: a dispersion compensating fiber with the above-mentioned first and second loss layers using the $LP_{02}$ mode, a dispersion compensating fiber using the $LP_{02}$ mode without a loss layer, and a conventional dispersion compensating fiber using the $LP_{01}$ mode. Three types of dispersion compensating modules were fabricated using the above three fibers in the configuration shown in FIG. 16 and their characteristics were compared.

TABLE 6

| Mode Converter | Conventional DCF | HOM-DCF with Loss Layer | | HOM-DCF without Loss Layer | |
| --- | --- | --- | --- | --- | --- |
| | | Holey fiber | LPG | Holey fiber | LPG |
| Dispersion [ps/nm/km] | −80 | −440 | | −440 | |
| Employed Mode Insertion Loss [dB/km] | 0.35 | 0.98 | | 0.50 | |
| Unnecessary Mode Insertion Loss [dB/km] | — | 12.2 | | 0.50 | |
| Length [km] | 17.0 | 3.09 | | 3.09 | |
| Employed Mode Splice Loss [dB/Conn.] | 0.50 | 2.0 | 0.23 | 2.0 | 0.23 |
| Unnecessary Mode Splice Loss [dB/Conn.] | — | 9.0 | 13.0 | 9.0 | 13.0 |
| Employed Mode Total Loss [dB/km] | 6.95 | 7.02 | 3.49 | 5.55 | 2.01 |
| FOM [ps/nm/km] | 196 | 194 | 390 | 245 | 677 |
| MPI [dB] | — | 48.7 | 60.2 | 14.0 | 25.5 |

The results listed in Table 6 clearly show that both FOM and MPI are greatly improved in a dispersion compensating fiber using the $LP_{02}$ mode having a loss layer.

Figure 22:
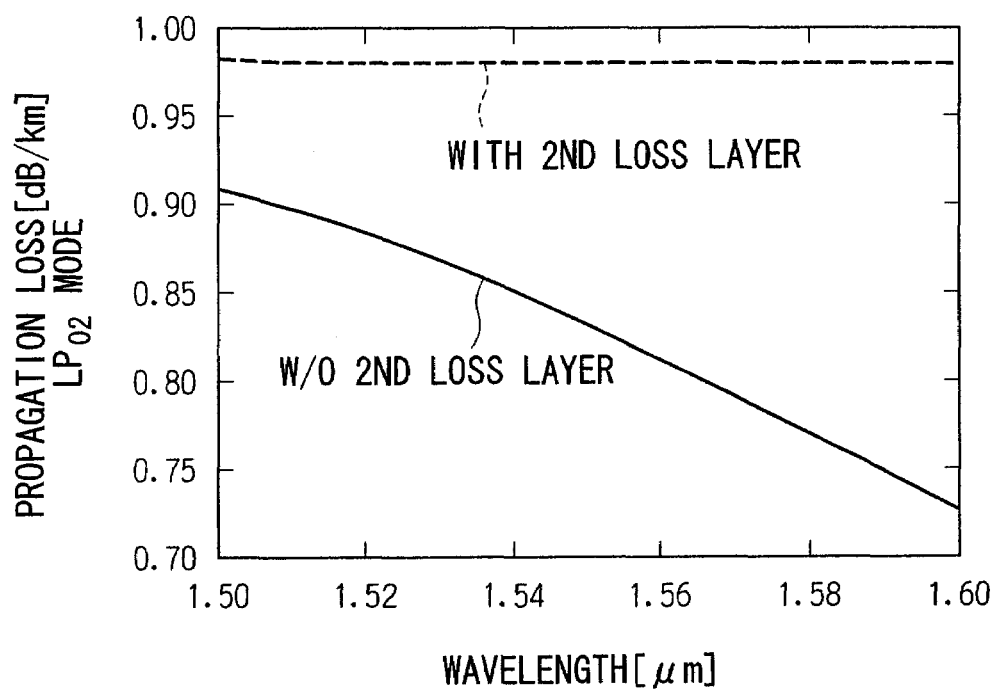
FIG. 22 is a graph showing the wavelength dependence of propagation loss of another configuration of the dispersion compensating fiber of Example 4.

Furthermore, the wavelength dependence of propagation loss of the dispersion compensating fiber in the $LP_{02}$ mode is shown in FIG. 22. The second loss layer was provided at a radial distance of 7.95 μm from the center with a thickness of 0.4 μm and $A_2$ of 3.18 dB, and was formed by doping 0.35 mole % of boron trioxide ($B_2O_3$) into the silica of which the cladding is made in Example 4.

As can be seen in FIG. 22, the second loss layer improves the maximum difference in loss from 0.18 dB/km to 0.022 dB/km in a wavelength range between 1.5 μm and 1.6 μm. The characteristics of this dispersion compensating fiber are similar to those of the dispersion compensating fiber of Example 4 in Table 6.

As described above, by providing a first loss layer which inhibits propagation of a lower order mode, e.g., the $LP_{01}$ mode, but allows propagation of a higher order mode, e.g., the $LP_{02}$ mode, in the higher order mode dispersion compensating fiber of the present invention, loss of the higher order $LP_{02}$ mode during propagation is inhibited while the lower order $LP_{01}$ mode experiences a large loss. Thus, multipass interference can be greatly improved.

Furthermore, by providing a second loss layer which diminishes the wavelength dependence of the propagation loss in the higher order mode, the wavelength dependence of the propagation loss is reduced at a wide 1.55 μm band in use, thereby a flat loss characteristic is obtained.

Therefore, when a higher order mode dispersion compensating fiber is used for dispersion compensation, even if a mode converter with a relatively poor conversion characteristic which is indispensable for the conversion is used, the dispersion compensating fiber of the present invention provides excellent multipass interference since propagation of unnecessary modes, e.g., the $LP_{01}$ mode, is almost completely eliminated in the dispersion compensating fiber.

Furthermore, by utilizing a higher order mode, a large dispersion index is realized, thereby the fiber length required for compensation can be reduced. Furthermore, since the fiber has a wide effective core area, signal light having high optical power is not affected by a nonlinear effect.

Furthermore, a flat loss-wavelength characteristic eliminates the need for an extra device, such as an equalizer or a filter.

(Mode Converter)

Exemplary embodiments of a mode converter of the present invention will be described in greater detail with reference to the accompanying drawings.

Figure 24:
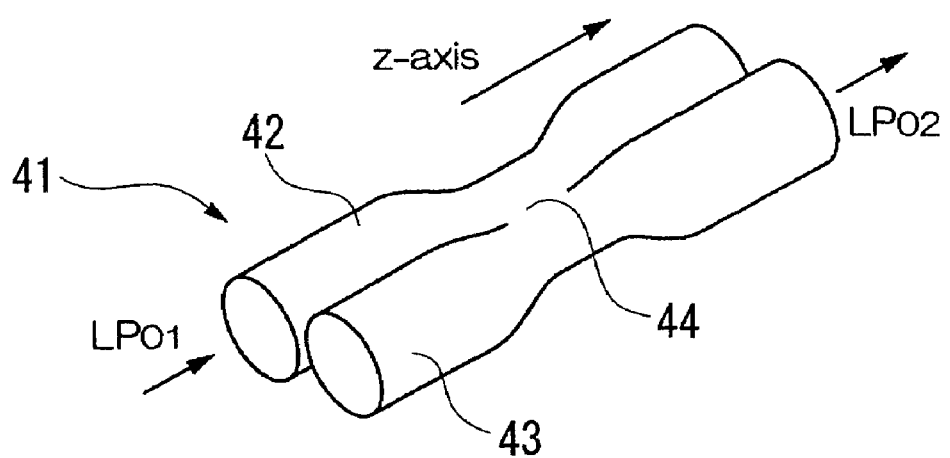
FIG. 24 is a perspective view of a mode converter for a higher order fiber according to one embodiment of the present invention.

FIG. 24 illustrates a mode converter for a higher order fiber according to one embodiment of the present invention. The mode converter for a higher order fiber 41 includes a fused-elongated portion 44 which is formed by fusing and elongating an SMF 42 and an HOM-DCF 43, and the fused-elongated portion 44 converts between the $LP_{01}$ mode of the SMF 42 and the $LP_{02}$ mode of the HOM-DCF 43.

In response to the incidence of the $LP_{01}$ mode from the SMF 42, the $LP_{01}$ mode is converted to the $LP_{02}$ mode by the fused-elongated portion 44 and exits from the HOM-DCF 43. The power conversion ratio P(z) is determined by Formula (5) (A. Yariv, "Coupled-mode theory for guided-wave optics", IEEE J. Quantum Electronics, vol. QE-9, pp. 919-933, 1973):

$$P(z) = \frac{1}{1 + \left(\frac{\delta}{|\kappa|^2}\right)} \sin^2 qz \quad (5)$$

where q and δ are determined by Formulas (6) and (7), respectively:

$$q = \sqrt{|\kappa|^2 + \delta^2} \quad (6)$$

$$\delta = \frac{\beta_2 - \beta_1}{2} \quad (7)$$

where β1 and β2 are propagation constants in the $LP_{01}$ and the $LP_{02}$ modes, respectively, and κ is the mode coupling index. The conversion ratio to the $LP_{01}$ mode of the SMF 42 when the $LP_{02}$ mode is incident to the HOM-DCF 43 is also determined by Formula (5) using the reciprocity theorem.

As can be seen from Formula (5), the condition of $\delta=0$ needs to be satisfied for obtaining the complete coupling (P=1), meaning that satisfaction of the phase matching condition expressed by Formula (8) is required:

$$\beta_2 - \beta_1 = 0 \quad (8)$$

The coupling length Lc is determined by Formula (9):

$$L_C = \frac{\pi}{2q}(2m+1) = \frac{\pi}{2|\kappa|}(2m+1), \quad m = 0, 1, \ldots \quad (9)$$

Figure 25:
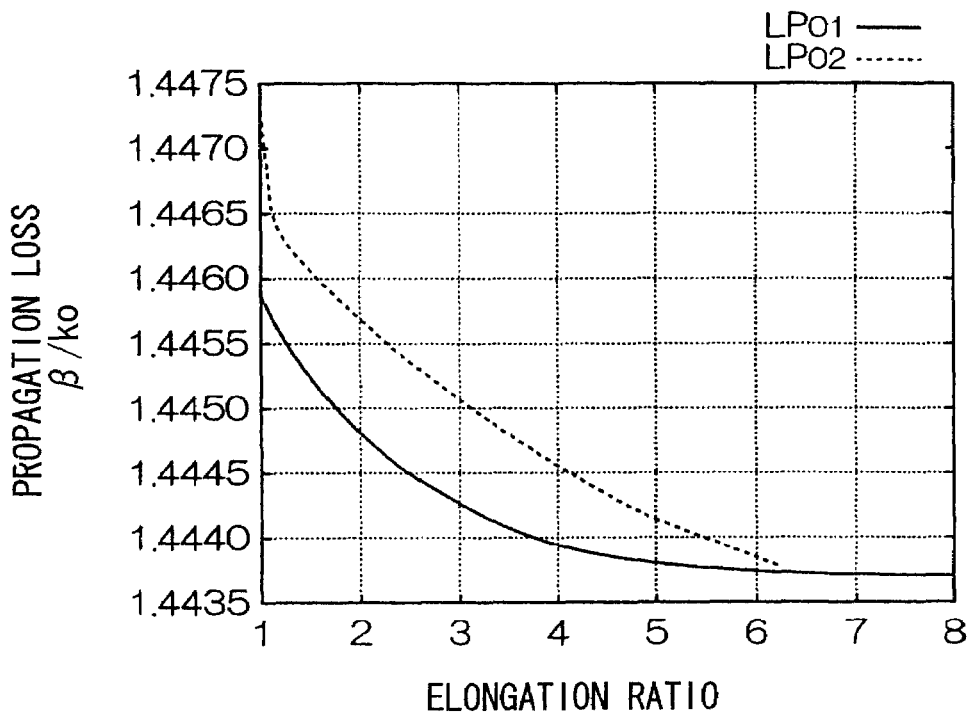
FIG. 25 is a graph of propagation constant versus elongation ratio of the $LP_{01}$ mode of an SMF and the $LP_{02}$ mode of an HOM-DCF.

FIG. 25 illustrates the relationship between propagation constants and elongation ratios in the $LP_{01}$ mode of an SMF and the $LP_{02}$ mode of an HOM-DCF at a given wavelength. As used herein, elongation ratio e is the ratio of the length of the fiber before elongation to the length of the fiber after elongation. $\kappa$ is the wave number in a vacuum. As can be seen from FIG. 25, the propagation constants of the $LP_{01}$ and the $LP_{02}$ modes do not match at a given elongation ratio. This example shows that a higher elongation ratio of the HOM-DCF is required to obtain a match in propagation constants of the $LP_{01}$ and the $LP_{02}$ modes.

In an exemplary embodiment of the present invention, the propagation constants of the two fibers are matched by elongating the HOM-DCF (pre-elongation) and then fusing with the SMF and elongating the fused fibers (post-elongation) to form a fused-elongated portion. This effectively lowers the elongation ratio (post-elongation ratio) of the fused-elongated portion for matching the propagation constants of the two fibers. The fused-elongated portion may have a coupling length and an elongation ratio such that the complete coupling between the $LP_{01}$ and the $LP_{02}$ modes is obtained. Furthermore, the pre-elongation ratio $e_1$ and the post-elongation ratio $e_2$ of the HOM-DCF may be between 1 and 3 and between 1 and 5, respectively.

Figure 26:
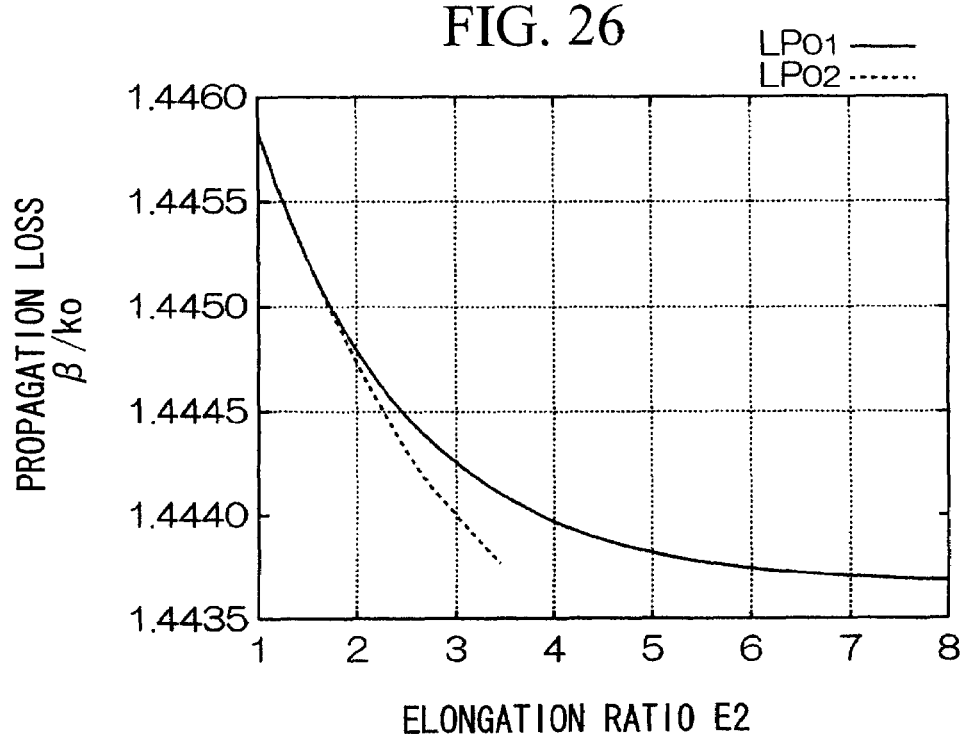
FIG. 26 is a graph of propagation constant versus elongation ratio of the $LP_{01}$ mode of an SMF and the $LP_{02}$ mode of an HOM-DCF after pre-elongation.

FIG. 26 illustrates the relationship between propagation constants and elongation ratios when the HOM-DCF is pre-elongated with an elongation ratio $e_1$ of 1.8, and then fused with the SMF and post-elongated at various post-elongation ratios $e_2$. In this example, the actual elongation ratio e of the HOM-DCF is $e_1 e_2$. As can be seen from the figure, the propagation constants of the two modes agree when the post-elongation ratio $e_2$ is between 1 and 2. Introducing this pre-elongation step, a higher $LP_{01}$-$LP_{02}$ conversion ratio can be obtained in a wide band. Furthermore, the conversion characteristic of the converter according to the present invention is not substantially affected by environmental factors including temperature.

In the mode converter for a higher order fiber according to the present invention, a fused-elongated portion having a coupling length and an elongation ratio which provide the complete coupling between the $LP_{01}$ and the $LP_{02}$ modes substantially eliminates conversion to unnecessary modes and enhances the reliability of the converter. Furthermore, the conversion ratio of the fused-elongated portion from the $LP_{01}$ mode of the single mode fiber to the $LP_{02}$ mode may be 75% or higher in a wavelength range between 1.55 μm and 1.65 μm. With a conversion ratio of 75% or greater, the optical power loss during mode conversion is reduced, allowing production of a low loss mode converter.

One exemplary SMF used for the converter according to the present invention has a stepped refractive index profile with a core radius r between 2 μm to 7 μm and a relative refractive index difference $\Delta$ in the range between 0.0025 to 0.007, for example. An exemplary HOM-DCF used for the converter according to the present invention includes radially from the center toward the outside fiber: a first layer which has the highest refractive index; a second layer which is provided at an outer periphery of the first layer and has the lowest refractive index; and a third layer which is provided at an outer periphery of the second layer and has a refractive index in a range between the refractive index of the first layer and the refractive index of the second layer, wherein the first layer has a radius $r_{51}$ between 2 μm and 8 μm and a relative refractive index difference $\Delta_{51}$ between 0.005 and 0.025, the second layer has a radius $r_{52}$ between 4 μm and 14 cm and a relative refractive index difference $\Delta_{52}$ between −0.005 and 0.005, and the third layer has a radius $r_{53}$ between 8 μm and 25 μm and a relative refractive index difference $\Delta_{53}$ between −0.002 and 0.004.

The numbers of SMFs and HOM-DCFs used in the fused-elongated portion of the present invention are not limited to one; a plurality of fibers may be used to form the fused-elongated portion.

The advantageous effects of the present invention will now be described in detail using the examples. It should be understood, however, that they are not intended to limit the invention to the particular examples described.

EXAMPLE 5

Figure 27:
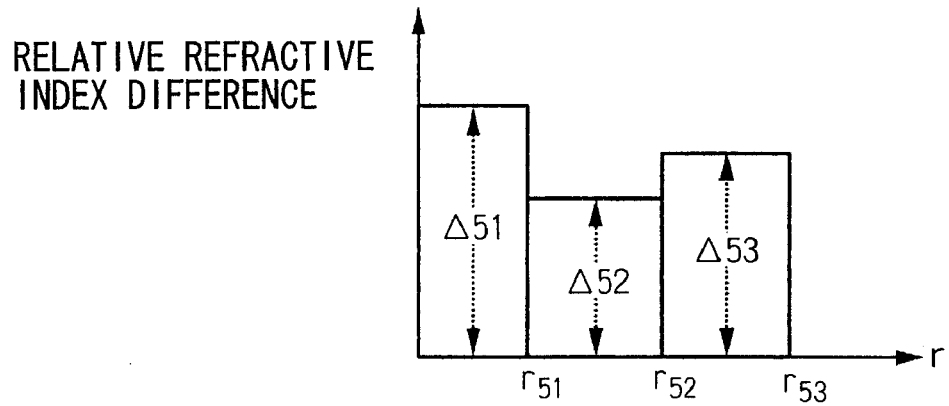
FIG. 27 is a schematic diagram showing a refractive index distribution profile of an HOM-DCF.

An SMF having the profile shown in Table 7 and an HOM-DCF having the profiles shown in Table 8 were fabricated by modified chemical vapor deposition. The SMF of Table 7 has a stepped refractive index profile with a core radius r of 4.8 μm. The HOM-DCF of Table 8 has the profile shown in FIG. 27, and it includes: a first layer which has the highest refractive index; a second layer which is provided at an outer periphery of the first layer and has the lowest refractive index; and a third layer which is provided at an outer periphery of the second layer and the refractive index thereof is between that of the first and that of the second layer.

TABLE 7

| Layer | Radius [μm] | Relative RI Difference $\Delta$ |
|---|---|---|
| 1 | 4.8 | 0.0032 |

TABLE 8

| Layer | Radius [μm] | Relative RI Difference $\Delta$ |
|---|---|---|
| 1 | 4.0 | 0.02 |
| 2 | 8.0 | −0.0006 |
| 3 | 15.0 | 0.003 |

Figure 28:
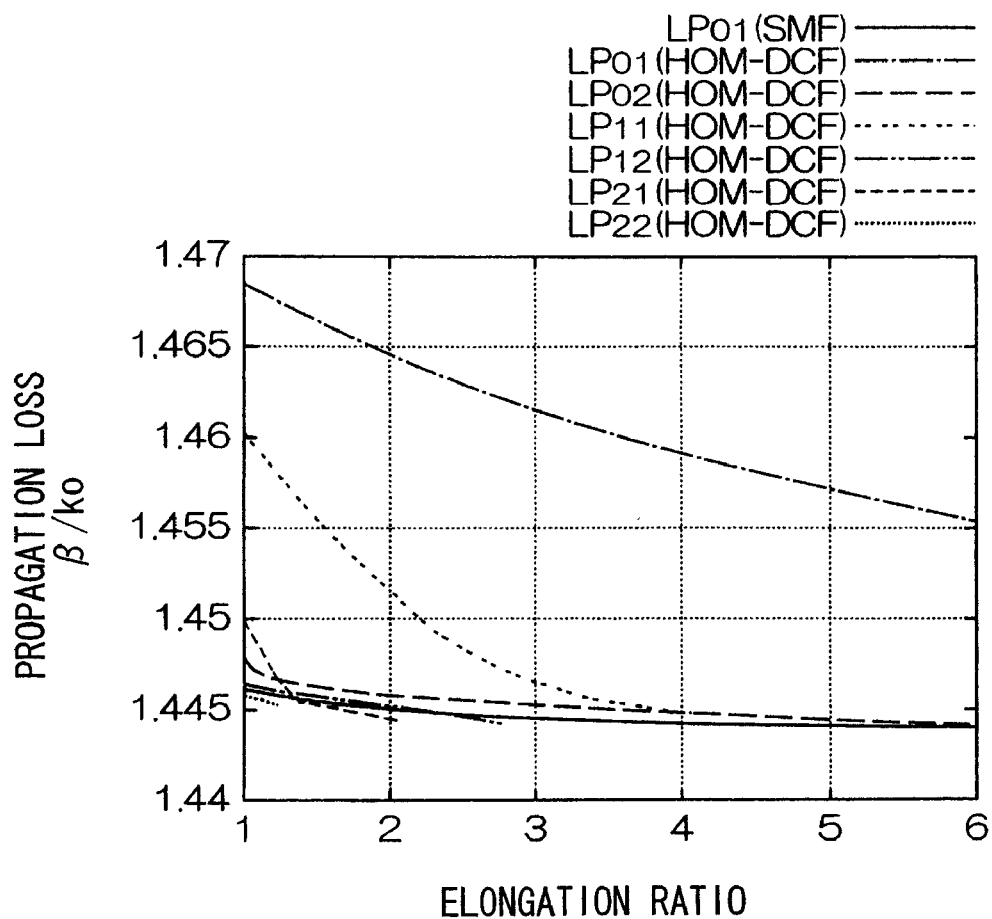
FIG. 28 is a graph of propagation constant versus elongation ratio of the $LP_{01}$ mode of an SMF and various modes of an HOM-DCF.

The relationship between propagation constants and elongation ratios of the $LP_{01}$ mode of the SMF and the major propagation modes of the HOM-DCF at a wavelength $\lambda$ of 1.6 μm is shown in FIG. 28. As can be seen from the figure, the propagation constants of the $LP_{02}$ mode of the HOM-DCF and the $LP_{01}$ mode of the SMF roughly agree whereas the propagation constants of the $LP_{01}$ and $LP_{11}$ modes of the HOM-DCF deviate from those. Therefore, a fused-elongated portion easily converts the $LP_{01}$ mode of the SMF to the $LP_{02}$ mode of the HOM-DCF while performing almost no conversion to the $LP_{01}$ and $LP_{11}$ modes of the HOM-DCF. Furthermore, since the $LP_2$, and $LP_{22}$ modes of the HOM-DCF are cut off with a higher elongation ratio, coupling to these modes can be eliminated by a pre-elongation followed by an elongation (post-elongation).

Figure 29:
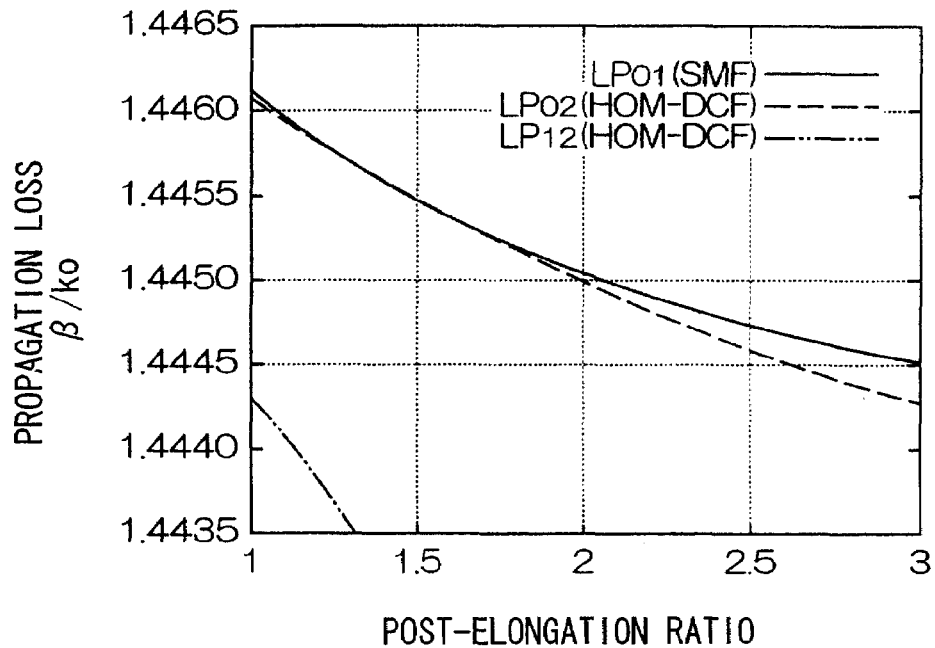
FIG. 29 is a graph of propagation constant versus elongation ratio of the $LP_{01}$ mode of an SMF and the $LP_{02}$ and $LP_{12}$ modes of an HOM-DC after pre-elongation.

The mode other than the $LP_{02}$ mode which easily enables coupling is the $LP_{02}$ mode of the HOM-DCF. As shown in FIG. 29, however, when the HOM-DCF is pre-elongated with an elongation ratio $e_1$ of 1.8, and then fused with the SMF and post-elongated at varying post-elongation ratios $e_2$, the propagation constants of the $LP_{01}$ mode of the SMF and the $LP_{02}$ mode of the HOM-DCF agree whereas the propagation constants of the $LP_{12}$ mode of the HOM-DCF deviate from those.

Figure 30:
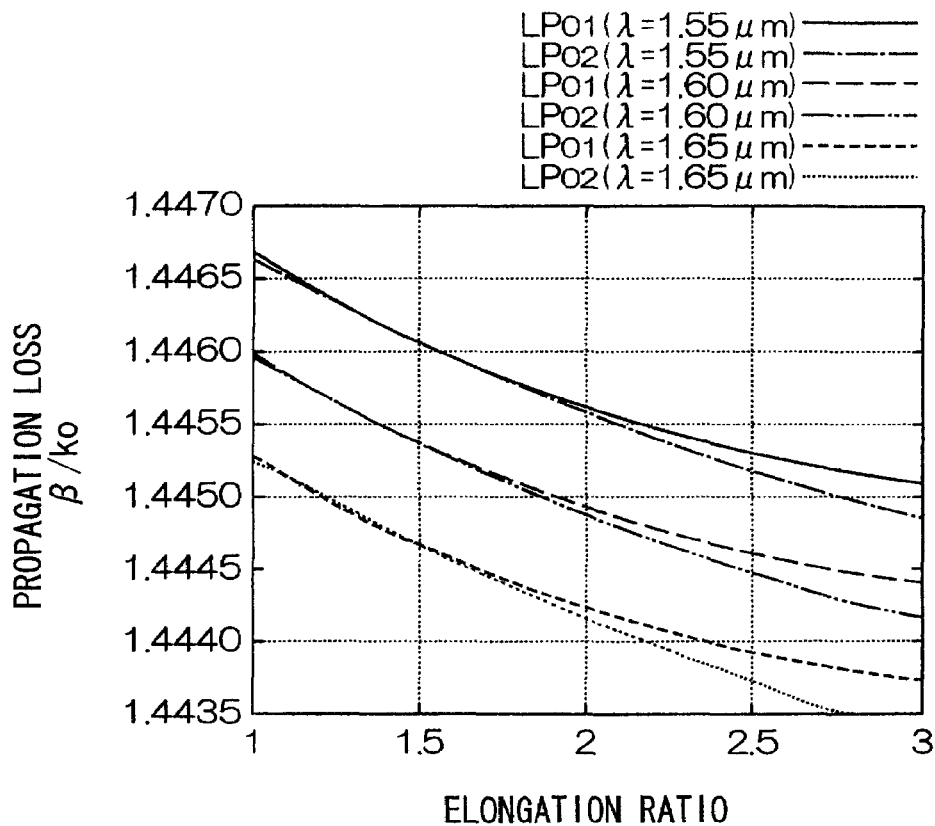
FIG. 30 is a graph of propagation constant versus elongation ratio of the $LP_{01}$ mode of an SMF and the $LP_{02}$ mode of an HOM-DCF at various wavelengths.

FIG. 30 illustrates propagation constants of the $LP_{01}$ mode of the SMF and the $LP_{02}$ mode of the HOM-DCF at various wavelengths when the HOM-DCF is pre-elongated with an elongation ratio $e_1$ of 1.8, and then fused with the SMF and post-elongated at various post-elongation ratios $e_2$. As can be seen from the figure, the propagation constants of the two modes are matched when a post-elongation ratio $e_2$ between 1 and 2 is used at all wavelengths. This means that a mode converter capable of converting a wider band can be obtained when two fibers are fused and elongated to form a tapered shape.

Figure 31:
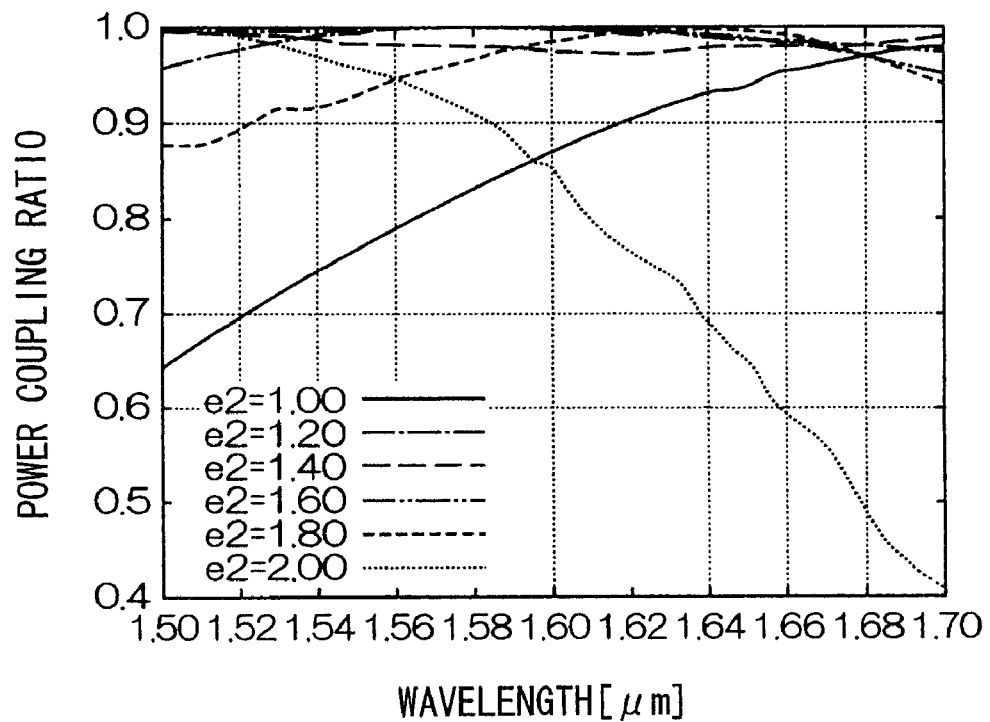
FIG. 31 is a graph of the power coupling ratio versus wavelength when converting from the $LP_{01}$ mode of an SMF to the $LP_{02}$ mode of an HOM-DCF.

FIG. 31 shows the relationship between power coupling ratios from the $LP_{01}$ mode of an SMF to the $LP_{02}$ mode of an HOM-DCF and wavelengths when keeping the coupling index $\kappa$ of 0.157 mm$^{-1}$ and coupling length Lc of 10 mm constant. The pre-elongation ratio $e_1$ of the HOM-DCF was 1.8. A post-elongation ratio between 1.2 and 1.8 gives a high power coupling ratio of 0.90 or greater in the wavelength band between 1.52 µm and 1.70 µm, which corresponds to an $LP_{01}$-$LP_{02}$ conversion ratio of 90% or higher.

Figure 32:
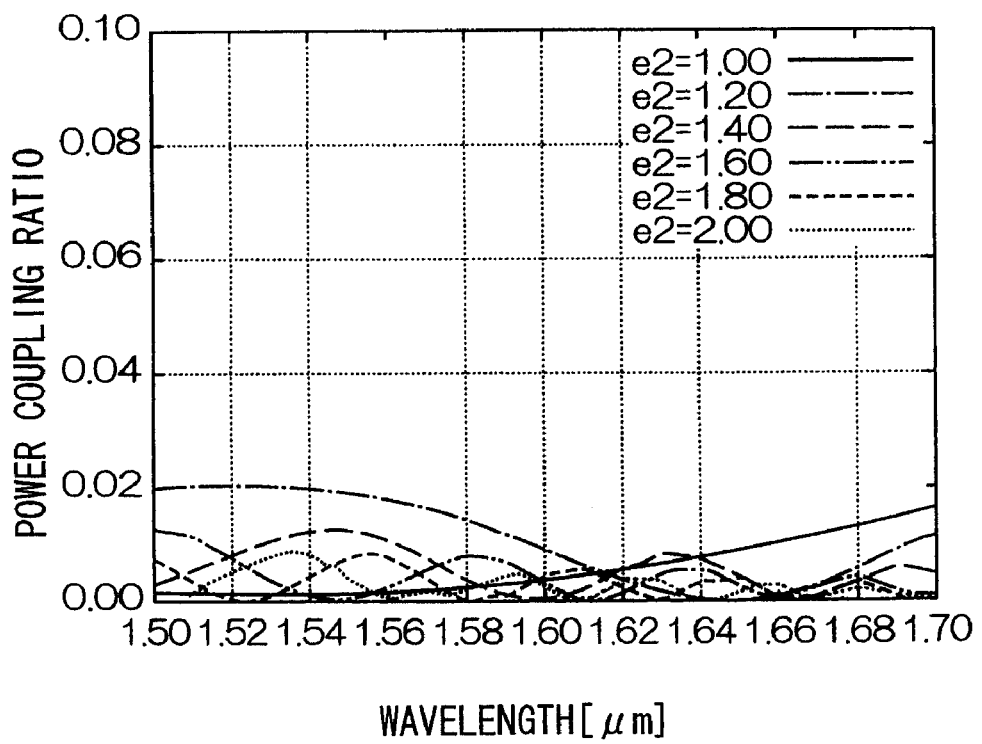
FIG. 32 is a graph of the power coupling ratio versus wavelength when converting from the $LP_{01}$ mode of an SMF to the $LP_{12}$ mode of an HOM-DCF.

FIG. 32 shows the relationship between the power coupling ratio from the $LP_{01}$ mode of an SMF to the $LP_{12}$ mode of an HOM-DCF under the same conditions as FIG. 31. As can be seen from the figure, the power coupling ratio is low with 0.02 or less at all post-elongation ratios, which corresponds to a conversion ratio of 2% or less.

Figure 33:
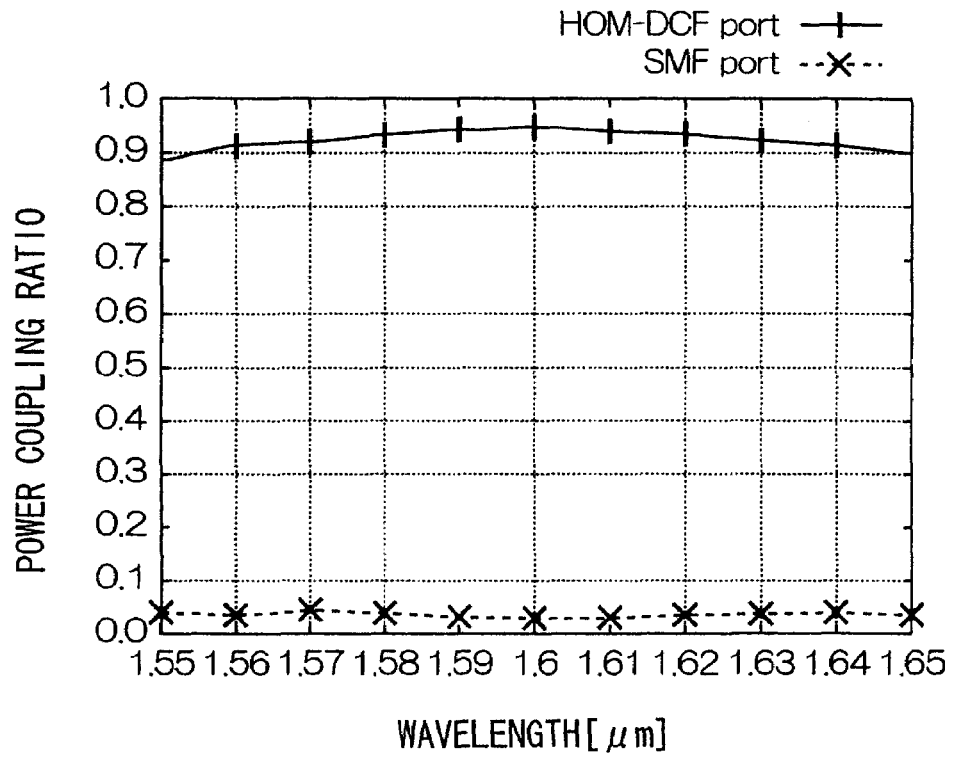
FIG. 33 is a graph of the power coupling ratio versus wavelength of a mode converter for a higher order of Example 5.

FIG. 33 shows the coupling characteristic of a mode converter for a higher order fiber which was actually assembled. Eighty-eight percent of the power of the light entering the input SMF port was output to the output HOM-DCF port, and 5% was output to the output SMF port. At the output HOM-DCF port, power of the $LP_{02}$ mode accounts for 90% or more of the overall power.

EXAMPLE 6

An SMF having the profile shown in Table 9 and the HOM-DCF used in Example 5 were used.

TABLE 9

| Layer | Radius [µm] | Relative RI Difference Δ |
|---|---|---|
| 1 | 5.5 | 0.0032 |

The SMF of this example has a larger core radius than Example 5, which increases the equivalent index of the $LP_{01}$ mode and brings it close to the level of the equivalent index of the $LP_{02}$ mode of the HOM-DCF. This reduces the required pre-elongation ratio, which expands the range where the equivalent indices of the $LP_{01}$ mode of the SMF and the $LP_{02}$ mode of the HOM-DCF agree.

Figure 34:
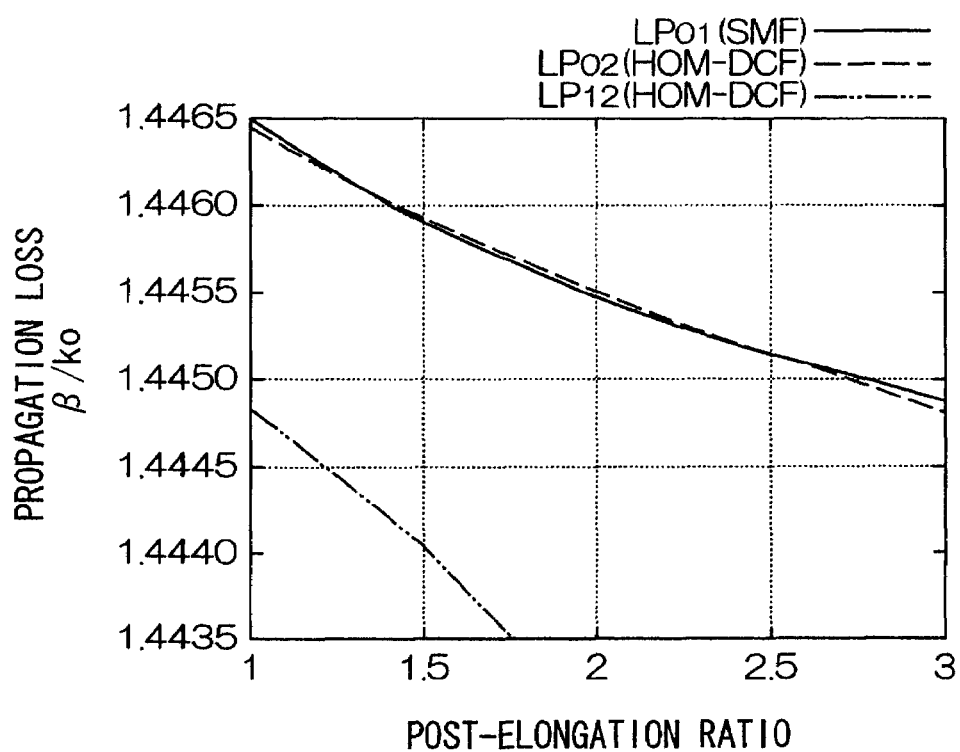
FIG. 34 is a graph of the power coupling ratio versus wavelength of a mode converter for a higher order fiber of Example 6 at a wavelength of 1.60 μm.

FIG. 34 illustrates the relationship between propagation constants at a wavelength of 1.60 µm and elongation ratios when an HOM-DCF is pre-elongated with an elongation ratio $e_1$ of 1.35, and then fused with an SMF and post-elongated at various post-elongation ratios $e_2$. As can be seen from the figure, the propagation constants of the $LP_{01}$ mode of the SMF and the $LP_{02}$ mode of the HOM-DCF are matched when a post-elongation ratio $e_2$ between 1 and 3 is used. This means that the manufacturing tolerance of the converter can be reduced.

EXAMPLE 7

An SMF having the profile shown in Table 10 and the HOM-DCF used in Example 5 were used.

TABLE 10

| Layer | Radius [µm] | Relative RI Difference Δ |
|---|---|---|
| 1 | 6.0 | 0.0032 |

The SMF of this example has an even larger core radius than the above-mentioned examples, which increases the equivalent index of the $LP_{01}$ mode and brings it closer to the level of the equivalent index of the $LP_{02}$ mode of the HOM-DCF. This further reduces the required pre-elongation ratio, which expands the range where the equivalent indices of the $LP_{01}$ mode of the SMF and the $LP_{02}$ mode of the HOM-DCF agree.

Figure 35:
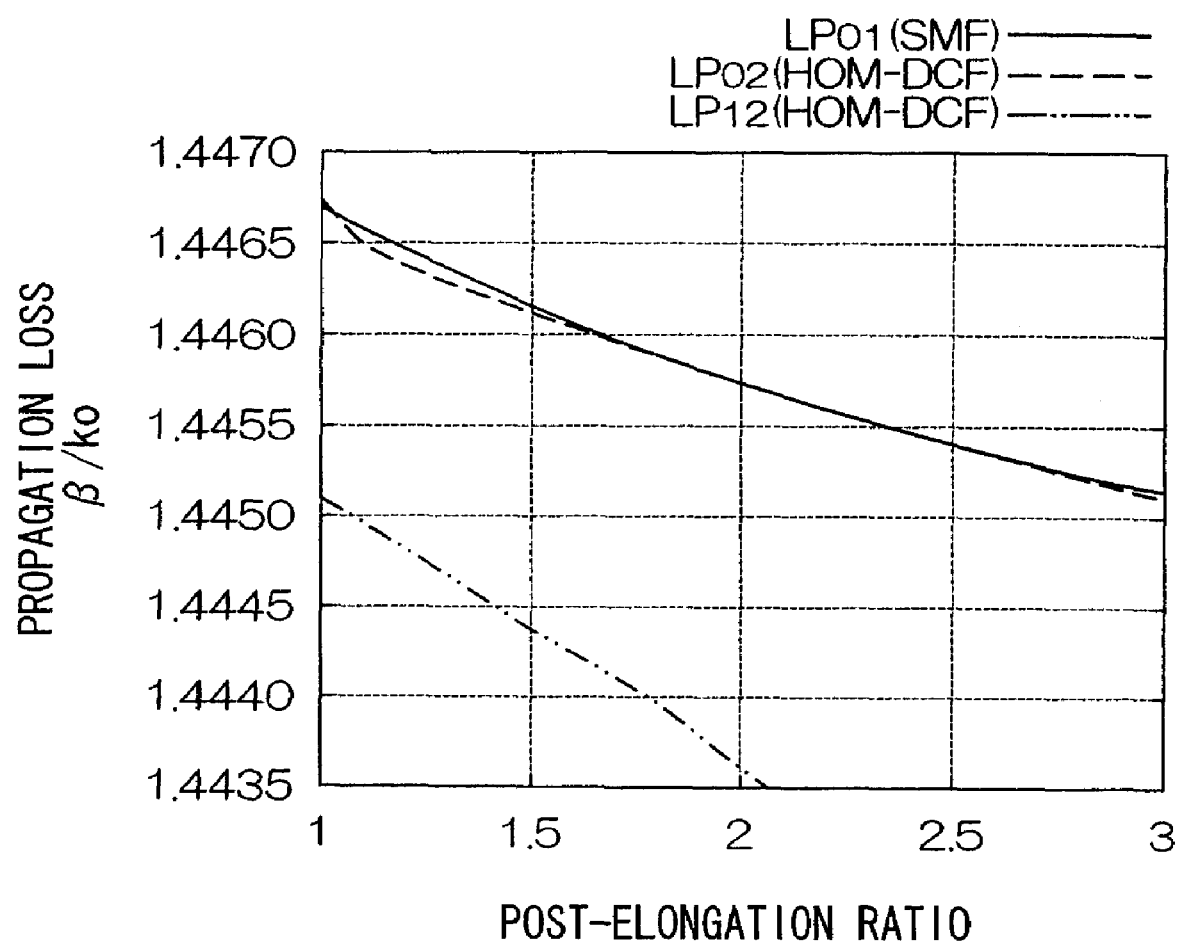
FIG. 35 is a graph of the power coupling ratio versus wavelength of a mode converter for a higher order fiber of Example 7 at a wavelength of 1.60 μm.

FIG. 35 illustrates the relationship between propagation constants at a wavelength of 1.60 µm and elongation ratios when an HOM-DCF is pre-elongated with an elongation ratio $e_1$ of 1.15, and then fused with an SMF and post-elongated at various post-elongation ratios $e_2$. As can be seen from the figure, the propagation constants of the $LP_{01}$ mode of the SMF and the $LP_{02}$ mode of the HOM-DCF are matched when a post-elongation ratio $e_2$ between 1 and 3 is used. This means that the manufacturing tolerance of the converter can be reduced.

EXAMPLE 8

In this example, the relative refractive index difference Δ of the $LP_{02}$ mode of an HOM-DCF was changed. In Examples 6 and 7, however, the equivalent index of the $LP_{01}$ mode of the SMF was changed to bring it close to the equivalent index of the $LP_{02}$ mode of the HOM-DCF by varying the core radius of the SMF. A similar result was obtained in this example. Furthermore, a similar result was obtained when changing the profile of the HOM-DCF.

As described above, a mode converter for a higher order fiber according to the present invention includes a fused-elongated portion which has been formed by fusing and elongating an SMF and an HOM-DCF, and the fused-elongated portion converts between the $LP_{01}$ mode of the SMF and the $LP_{02}$ mode of the HOM-DCF. Mode converters having this configuration are easier to manufacture compared to conventional converters. In addition, the above-mentioned configuration provides higher conversion ratios at a wide frequency band. Furthermore, the conversion characteristics become less susceptible to environmental changes, such as temperature; thus more reliable converters can be obtained.

In the mode converter for a higher order fiber according to the present invention, the fused-elongated portion is formed by pre-elongating an SMF and an HOM-DCF and then fusing and post-elongating them so that the propagation constant $\beta_1$ of the $LP_{01}$ mode substantially equals the propagation constant $\beta_2$ of the $LP_{02}$ mode. This configuration gives a high $LP_{01}$-$LP_{02}$ conversion ratio at a wide frequency band. Furthermore, by etching the outer surface of the two fibers before fusing them, an effective mode coupling is obtained and the length of the fused-elongated portion can be reduced. Thus, a smaller mode converter may be obtained.

By using a pre-elongation ratio $e_1$ between 1 and 3 and a post-elongation ratio $e_2$ between 1 and 5 of an SMF or an HOM-DCF, a high mode conversion ratio can be obtained at a wide frequency band, and a smaller mode converter can be produced.

In a mode converter for a higher order fiber according to the present invention, a fused-elongated portion having a coupling length and an elongation ratio which provide complete coupling between the $LP_{01}$ and the $LP_{02}$ modes substantially eliminates conversion to unnecessary modes and enhances the reliability of the conversion.

Furthermore, by using a conversion ratio of 75% or greater from the $LP_{01}$ mode of the single mode fiber to the $LP_{02}$ mode in a wavelength range between 1.55 μm and 1.65 μm, the optical power loss during mode conversion is reduced, allowing production of a low loss mode converter.

While exemplary embodiments of the invention have been described and illustrated above, it should be understood that these are examples of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A mode converter for a higher order fiber comprising:
a single mode fiber;
a higher order mode dispersion compensating fiber; and
a fused-elongated portion, which is formed by fusing and elongating the single mode fiber and the higher order mode dispersion compensating fiber, and which converts between the $LP_{01}$ mode of the single mode fiber and the $LP_{02}$ mode of the higher order mode dispersion compensating fiber;
wherein the fused-elongated portion is formed by pre-elongating at least one of the single mode fiber and the higher order mode dispersion compensating fiber and then fusing and post-elongating the single mode fiber and the higher order mode dispersion compensating fiber so that a propagation constant of the $LP_{01}$ mode substantially equals a propagation constant of the $LP_{02}$ mode.

2. The mode converter for a higher order fiber according to claim 1, wherein a conversion ratio from the $LP_{01}$ mode of the single mode fiber to the $LP_{02}$ mode of the higher order mode dispersion compensating fiber is substantially 75% or higher in a wavelength range between 1.55 μmm and 1.65 μm.

3. A mode converter for a higher order fiber comprising:
a single mode fiber;
a higher order mode dispersion compensating fiber; and
a fused-elongated portion, which is formed by fusing and elongating the single mode fiber and the higher order mode dispersion compensating fiber, and which converts between the $LP_{01}$ mode of the single mode fiber and the $LP_{02}$ mode of the higher order mode dispersion compensating fiber;
wherein the fused-elongated portion is formed by etching an outer surface of the single mode fiber and an outer surface of the higher order mode dispersion compensating fiber without changing characteristics of the fibers, and then fusing and elongating the single mode fiber and the higher order mode dispersion compensating fiber so that an effective coupling between the $LP_{01}$ and the $LP_{02}$ modes is obtained.

4. A mode converter for a higher order fiber comprising:
a single mode fiber;
a higher order mode dispersion compensating fiber; and
a fused-elongated portion, which is formed by fusing and elongating the single mode fiber and the higher order mode dispersion compensating fiber, and which converts between the $LP_{01}$ mode of the single mode fiber and the $LP_{02}$ mode of the higher order mode dispersion compensating fiber;
wherein the fused-elongated portion is formed by pre-elongating at least one of the single mode fiber and the higher order mode dispersion compensating fiber and then fusing and post-elongating the single mode fiber and the higher order mode dispersion compensating fiber so that a propagation constant of the $LP_{01}$ mode substantially equals a propagation constant of the $LP_{02}$ mode; and
wherein a pre-elongation ratio and a post-elongation ratio of at least one of the single mode fiber and the higher order mode dispersion compensating fiber are substantially between 1 and 3 and substantially between 1 and 5, respectively.

5. A mode converter for a higher order fiber comprising:
a single mode fiber;
a higher order mode dispersion compensating fiber; and
a fused-elongated portion, which is formed by fusing and elongating the single mode fiber and the higher order mode dispersion compensating fiber, and which converts between the $LP_{01}$ mode of the single mode fiber and the $LP_{02}$ mode of the higher order mode dispersion compensating fiber;
wherein the single mode fiber has a stepped refractive index profile, and has a core radius between about 2 μm and 7 μm and a relative refractive index difference between about 0.0025 and 0.007.

6. A mode converter for a higher order fiber comprising:
a single mode fiber;
a higher order mode dispersion compensating fiber; and
a fused-elongated portion, which is formed by fusing and elongating the single mode fiber and the higher order mode dispersion compensating fiber, and which converts between the $LP_{01}$ mode of the single mode fiber and the $LP_{02}$ mode of the higher order mode dispersion compensating fiber;
wherein the higher order mode dispersion compensating fiber comprises radially from the center toward the outside:
a first layer having a highest refractive index;
a second layer which is provided at an outer periphery of the first layer and has a refractive index lower than the refractive index of the first layer; and
a third layer which is provided at an outer periphery of the second layer and has a refractive index in a range between the refractive index of the first layer and the refractive index of the second layer; and
wherein the first layer has a radius substantially between 2 μm and 8 μm and a relative refractive index difference substantially between 0.005 and 0.025, the second layer has a radius substantially between 4 μm and 14 μm and a relative refractive index difference substantially between −0.005 and 0.005, and the third layer has a radius substantially between 8 μm and 25 μm and a relative refractive index difference substantially between −0.002 and 0.004.

* * * * *